(12) United States Patent  (10) Patent No.: US 6,559,562 B1
Rostron  (45) Date of Patent: May 6, 2003

(54) VOLTAGE SAG AND OVER-VOLTAGE COMPENSATION DEVICE WITH PULSE WIDTH MODULATED AUTOTRANSFORMER

(75) Inventor: Joseph R. Rostron, Hampton, GA (US)

(73) Assignee: SSI Power, LLC, Hampton, GA (US)

( * ) Notice: Subject to any disclaimer, the term of this patent is extended or adjusted under 35 U.S.C. 154(b) by 0 days.

(21) Appl. No.: 10/091,866

(22) Filed: Mar. 6, 2002

Related U.S. Application Data

(60) Provisional application No. 60/340,194, filed on Dec. 14, 2001.

(51) Int. Cl.[7] ............................................. H01H 35/00
(52) U.S. Cl. ...................... 307/130; 361/91.7; 323/255
(58) Field of Search .............................. 323/255, 258, 323/341, 343, 209; 307/130, 129, 85, 87, 125; 327/556, 557; 361/91.7

(56) References Cited

U.S. PATENT DOCUMENTS

| | | | |
|---|---|---|---|
| 5,006,784 A | | 4/1991 | Sonntagbauer |
| 5,119,012 A | | 6/1992 | Okamura |
| 5,155,672 A | * | 10/1992 | Brown ........................ 363/43 |
| 5,729,120 A | | 3/1998 | Stich et al. |
| 5,734,565 A | | 3/1998 | Mueller et al. |
| 5,905,367 A | | 5/1999 | Hochgraf |
| 5,920,132 A | * | 7/1999 | Rockfield et al. ........... 307/130 |
| 5,949,221 A | | 9/1999 | Edwards |
| 5,990,667 A | * | 11/1999 | Degeneff et al. ........... 323/258 |
| 6,005,788 A | | 12/1999 | Lipo et al. |
| 6,075,350 A | | 6/2000 | Peng |

* cited by examiner

Primary Examiner—Shawn Riley
(74) Attorney, Agent, or Firm—Gardner Groff & Mehrman, P.C.; Michael J. Mehrman

(57) ABSTRACT

A voltage sag and over-voltage compensation device for an AC electric power distribution system employing cascaded switching devices and a pulse width modulated autotransformer. The autotransformer typically includes lower, center, and upper poles or taps with cascaded switching devices for selectively connecting the voltage source (i.e., a phase of the distribution line) between the lower pole and the center or upper poles. Each stage of the cascaded switching device includes a switching element located within a full-bridge rectifier circuit to allow bi-directional switching through each switching element (i.e., switching through the same switching element during the positive and negative portions of the AC voltage cycle). Each full-bridge rectifier also includes a snubber circuit connected in parallel with a corresponding switching element to absorb the current discharge caused by switching the input power supply to the autotransformer through the corresponding switching device under non-zero current conditions. On the output side, the voltage sag and over-voltage compensation device includes a load capacitor to smooth the voltage-corrected AC power supply toward a sinusoidal power supply at the system frequency, and a notch filter to remove noise created by the switching elements.

32 Claims, 19 Drawing Sheets

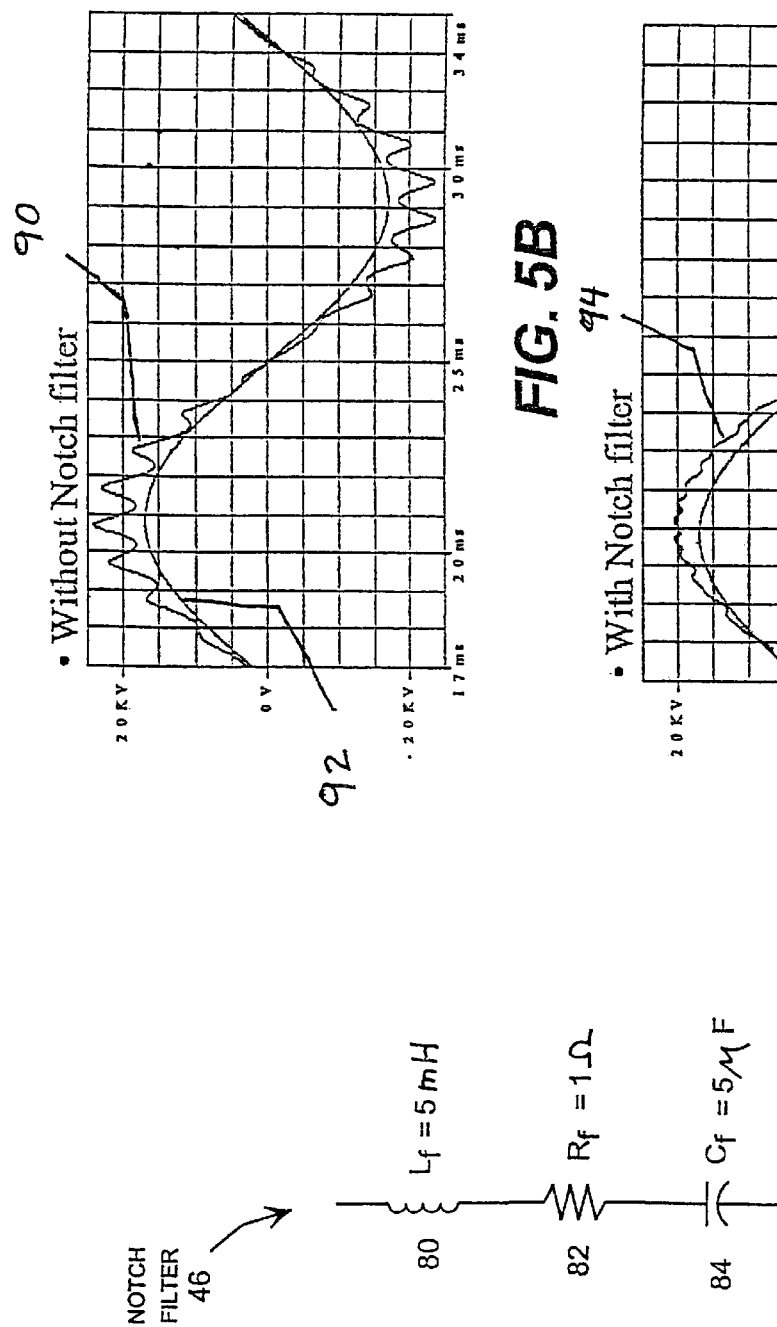
FIG. 5B — Without Notch filter
FIG. 5C — With Notch filter. Input and output voltage waveforms.
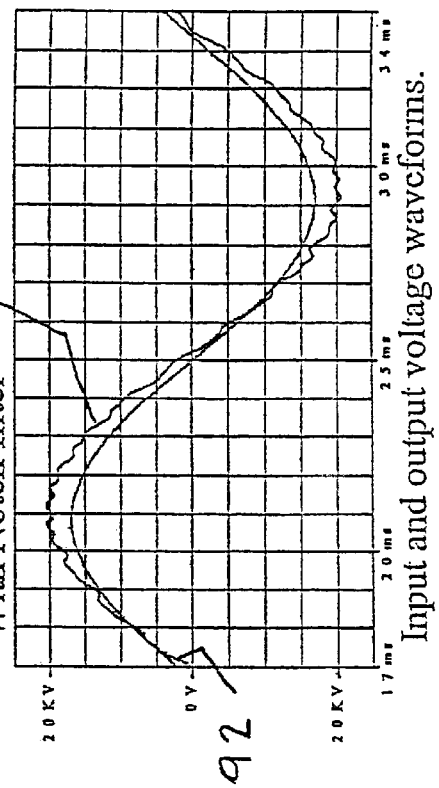
FIG. 5A

VOLTAGE SAG AND OVER-VOLTAGE COMPENSATION DEVICE WITH PULSE WIDTH MODULATED AUTOTRANSFORMER

REFERENCE TO RELATED APPLICATIONS

This application claim priority to commonly owned U.S. Provisional Patent Application Ser. No. 60/340,194, filed Dec. 14, 2001, entitled "Sag Supporter For Eliminating Voltage Sags By Using Multiple Transformer Taps And PWM Inverter On AC Voltage."

TECHNICAL FIELD

The present invention relates generally to the field of electric distribution power systems and, more particularly, relates to a voltage sag and over-voltage compensation device for an AC electric power distribution system employing a pulse width modulated autotransformer.

BACKGROUND OF THE INVENTION

Voltage sags and over-voltage conditions occasionally occur on AC power distribution systems for a variety of reasons, such as high resistance faults in the distribution system, fault clearing, switching large loads characterized by arcing during connection or disconnection of the load, other types of transient circuit overloading (e.g., dynamic disturbances), high load inductance during unusually heaving load periods, and line capacitance during unusually light load periods. Although these voltage conditions may be short lived, such as a few cycles in a, 50 or 60 Hertz electric power system for transient disturbances and fault clearing events, they can nonetheless cause sensitive loads, such as computer systems and manufacturing operations, to experience equipment damage and, in some cases, to drop off line. Therefore, devices that compensate for these voltage sags and over-voltage conditions, so that the loads receive an uninterrupted supply of the intended line voltage, serve an important function for these types of sensitive loads.

Certain conventional approaches to AC voltage compensation use traditional inverter technology, which rectifies the AC line power into DC power and stores the DC energy, typically in capacitors, batteries, or a flywheel during normal system operations. Then, during a voltage sag, the sag supporter device inverts the stored DC energy into AC power and delivers this power through a series-connected transformer to supply the missing voltage. This conventional inverter approach is complex and requires a large number of power switching elements to create the replacement voltage profile. The switching elements are relatively expensive and render the sag supporter financially infeasible for many applications. In addition, the duration of the available voltage support is limited by the amount of energy that can be stored prior to the voltage sag, and can therefore require large storage devices. Large storage devices can significantly increase the size of the device, often making pole-mounted configurations impractical. Alternatively, the circuitry required to repeatedly discharge and charge capacitors during the voltage sag condition presents complex control and timing challenges associated with continually recharging the capacitors to the proper level, and further increases the cost and sophistication of the device. In addition, the presence of a series-connected transformer in the power line during normal circuit operation causes significant power losses, even when voltage support is not required.

In another conventional approach, a tap switching series-connected transformer, often called a voltage regulator, may be used to compensate for voltage sag conditions. However, the large number of windings and switching elements required to provide a range of voltage sag compensation increases the cost of the voltage regulator and, in any event, limits the device to providing a discrete number of voltage steps in the output power supply. In addition, due the implementation time required for tap-changing voltage correction, these systems are ill suited to following fast changing voltage sag or over-voltage events, which typically occur when the cause of the voltage sag or over-voltage event involves a fault or switching event characterized by arcing. Arcing, by it's very nature, is erratic in behavior and changes quickly during the event as attachment points move around. Again with this type of device, the presence of a series-connected transformer in the power line during normal operations causes significant power losses.

Transient over-voltage conditions caused by the tap switching series-connected transformer presents another significant disadvantage of the tap-switching voltage regulator approach. This typically occurs when a breaker or fuse clears a fault causing the voltage sag, which abruptly returns the system to normal voltage. This typically occurs at a zero-current condition, which is followed buy the series-connected transformer boosting the voltage on it's output well above it's normal level for approximately 8 milliseconds until the transformer can be returned to its normal setting, which usually occurs at the next zero-current condition. This "current-zero switching" limitation occurs with these devices because they typically employ thyristor switching elements, which can only switch during zero-current conditions. Thus, notwithstanding multiple winding ratios and multiple switching elements, these systems still impose a significant over-voltage on the load at the conclusion of many voltage sag events.

Therefore, there is a need in the art for a compact, cost effective voltage sag and over-voltage compensation device that does not routinely impose over-voltage conditions on the loads they are designed to protect. There is also a need for a voltage sag and over-voltage compensation device that does not require a large number of switching devices, large power storage devices, or a series-connected transformer in the power line during normal operation of the circuit.

SUMMARY OF THE INVENTION

The present invention meets the needs described above in a voltage sag and over-voltage compensation device employing a pulse width modulated autotransformer. The device preferably operates at AC electric power distribution system voltages, but may be designed to operate at other voltage levels. This device significantly improves over conventional inverter technology in that no energy storage devices are required. The present invention also significantly improves over conventional tap-switching transformer technology in that no over-voltage is imposed on the load when a voltage sag event is over. Moreover, the technology of the present invention is much simpler than prior approaches for AC voltage compensation in that it reduces the number of active switching elements and uses well developed autotransformer technology as the basic design element. This advantageously allows switching to occur at higher voltages with lower currents than occurs in prior designs. In addition, a single switching frequency with a single pulse width for any given voltage sag or over-voltage condition makes the control system for the present invention relatively simple to design and implement. The end result is a comparatively uncomplicated design, which exhibits lower cost and higher reliability, while providing equivalent or improved functionality in comparison to prior art voltage compensation technologies.

Generally described, the present invention includes a voltage sag and over-voltage compensation device that receives electric power from an oscillating at a system frequency, adjusts the voltage of the power, and delivers a corresponding voltage-corrected AC power supply to a load connected across an upper pole and a neutral pole of the device. The voltage sag and over-voltage compensation device includes an autotransformer having a first winding around a flux linking core and connected between the neutral pole and a center pole, and a second winding around the flux linking core and connected between the center pole and the upper pole. The autotransformer also includes a center-pole switch for selectively connecting the AC power source between the neutral and center poles when the center-pole switch is gated to a closed or "on" configuration, and for selectively disconnecting the AC power source from connection between the neutral and center poles when the center-pole switch is gated to an open or "off" configuration. The voltage sag and over-voltage compensation device also includes a control unit for selectively gating the center-pole switch between the open configuration and the closed configuration multiple times per cycle of the system frequency to generate the voltage-corrected AC power supply for delivery to the load.

The center-pole switch is typically located within a full-bridge rectifier circuit connected between the AC power source and the center pole to allow bi-directional switching through a single switching element (i.e., switching through the same element during the positive and negative portions of the AC voltage cycle). The voltage sag and over-voltage compensation device also typically includes a center-pole snubber connected in parallel with the center-pole switch to absorb the current discharge caused by switching the power supply to the autotransformer under non-zero current conditions. In particular, the center-pole switch and the center-pole snubber are typically connected in parallel and located within the full-bridge rectifier circuit connected between the AC power source and the center pole.

For relatively high voltage applications, the center-pole switch includes a cascade of individual center-pole switching devices connected in series and operated substantially simultaneously, typically from a common gating signal. In this case, each individual center-pole switching device is located within an individual full-bridge rectifier circuit, and a plurality of center-pole snubber circuits may each be connected in parallel with one of the individual switching devices within its corresponding full-bridge rectifier circuit. Each center-pole snubber circuit may include a resistor and a capacitor connected in series and a diode connected in parallel with the resistor.

To smooth the voltage-corrected AC power supply toward a sinusoidal power supply at the system frequency, the voltage sag and over-voltage compensation device also includes a load capacitor connected between the neutral and upper poles of the autotransformer. The control unit typically gates the center-pole switch at a gating frequency, and to remove noise created by the switching elements, the voltage sag and over-voltage compensation device typically includes a notch filter connected between the neutral and upper poles or the autotransformer. This notch filter is preferably configured to reduce power disturbances occurring in the voklage-corrected AC power supply within a filter frequency range about the gating frequency. Specifically, the notch filter may include an inductor, a resistor, and a capacitor connected in series.

To permit normal operation of the power circuit without having the autotransformer connected in series in the power line, the voltage sag and over-voltage compensation device typically includes an upper-pole switch for selectively connecting the AC power source between the neutral and upper poles of the autotransformer when the upper-pole switch is gated to a closed or "on" configuration, and for selectively disconnecting the AC power source from connection between the neutral and upper poles when the upper-pole switch is gated to an open or "off" configuration. To absorb the current discharge caused by switching the power supply to the autotransformer under non-zero current conditions, the voltage sag and over-voltage compensation device typically an upper-pole snubber connected in parallel with the upper-pole switch. For relatively high voltage applications, the upper-pole switch may Include a cascade of individual upper-pole switching devices connected in series and operated substantially simultaneously, typically from a common gating signal. In this case, each individual upper-pole switching device may be located within an individual full-bridge rectifier circuit, and a plurality of upper-pole snubber circuits may each be connected in parallel with one of the individual switching devices within its corresponding full-bridge rectifier circuit. Each upper-pole snubber circuit may include a resistor and a capacitor connected in series and a diode connected in parallel with the resistor.

In a first mode of operation, the control unit gates the upper-pole and center-pole switching devices in substantial unison to maintain these switches in opposing configurations. That is, the upper-pole switch is gated off when the center-pole switch is gated on, and vice versa. More specifically, the control unit detects a voltage sag or over-voltage condition in the AC power source, and in response to detecting this condition, the control unit continually gates the upper-pole and center-pole switching devices in substantial unison to maintain these switches in opposing configurations to create a desired voltage-corrected AC power supply. The control unit then detects a cessation of the voltage sag or over-voltage condition in the AC power source, and in response to detecting the cessation of the condition, gates the center-pole switching device to an open configuration, gates the upper-pole switching device to a closed configuration, and discontinues further gating of switching devices.

In a second mode of operation, the control unit detects a voltage sag or overvoltage condition in the AC power source, and in response to detecting this condition, gates the upper-pole switching device to an open (i.e., by-pass) configuration. In this case, while the upper-pole switching device is held in the open (i.e., by-pass) configuration, the control unit continually gates the center-pole switching device between the open and closed configurations to create a desired voltage-corrected AC power supply. The control unit then detects a cessation of the voltage sag or over-voltage condition in the AC power source, and in response to detecting the cessation of the condition, gates the center-pole switching device to an open configuration, gates the upper-pole switching device to a closed configuration, and discontinues further gating of switching devices.

In view of the foregoing, it will be appreciated that the voltage sag and overvoltage compensation device of the present invention is a comparatively uncomplicated design, which exhibits lower cost and higher reliability, while providing equivalent or improved functionality in comparison to prior art technologies. The present invention also improves over prior AC voltage compensation technology in that no energy storage devices are required, and no overvoltage is imposed on the load at the conclusion of a voltage sag or event. The specific techniques and structures employed by the invention to improve over the drawbacks of the prior voltage sag and over-voltage compensation devices, and to accomplish the advantages described above will become apparent from the following detailed description of the embodiments of the invention and the appended drawings and claims.

BRIEF DESCRIPTION OF THE DRAWINGS

FIG. 5A is an electric circuit diagram of a notch filter in a voltage sag and over-voltage compensation device.

FIG. 5B is a voltage waveform diagram illustrating the output voltage of a voltage sag and over-voltage compensation device without a notch filter.

FIG. 5C is a voltage waveform diagram illustrating the output voltage of a voltage sag and over-voltage compensation device with a notch filter.

DETAILED DESCRIPTION OF THE PREFERRED EMBODIMENTS

Figure 1:
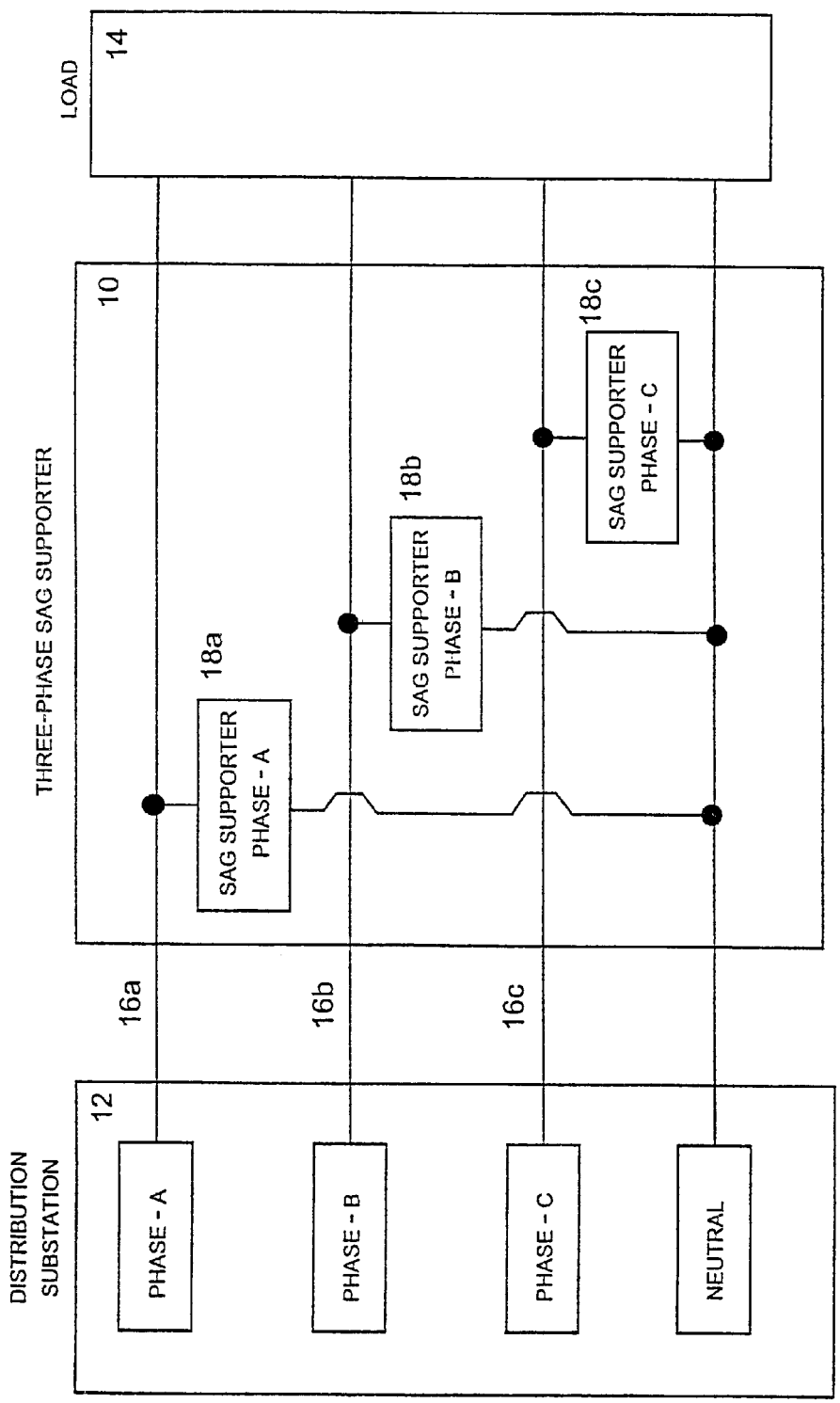
FIG. 1 is an electric circuit diagram of a three-phase voltage sag and over-voltage compensation device for an AC electric power distribution system.

The present invention may be embodied in a voltage sag and over-voltage compensation device for an AC electric power distribution system employing cascaded switching devices and a pulse width modulated autotransformer. The autotransformer typically includes lower, center, and upper poles or taps with cascaded switching devices for selectively connecting the voltage source (i.e., a phase of the distribution line) between the lower pole and the center or upper poles. Each stage of the cascaded switching device includes a switching element located within a full-bridge rectifier circuit to allow bi-directional switching through each switching element (i.e., switching through the same switching element during the positive and negative portions of the AC voltage cycle). Each full-bridge rectifier also includes a snubber circuit connected in parallel with a corresponding switching element to absorb the current discharge caused by switching the input power supply to the autotransformer through the corresponding switching device under non-zero current conditions. On the output side, the voltage sag and over-voltage compensation device includes a load capacitor to smooth the voltage-corrected AC power supply toward a sinusoidal power supply at the system frequency, and a notch filter to remove noise created by the switching elements.

Because it is desirable to prevent the voltage at the customer's location from becoming significantly above or below normal, the Pulse Width Modulation (PWM) technique may be used to increase or reduce the output voltage of the compensation device with respect to the input source voltage. This range of control is possible because the input to the autotransformer is reduced by the percentage of "off" time in the pulse to the autotransformer. This allows the system to vary the output voltage of the autotransformer continuously from the autotransformer turns ratio times the input source voltage (e.g., twice the input source voltage in an autotransformer with a 2:1 turns ratio) to zero by changing the ratio of "on" and "off" time for connecting the input power supply to the autotransformer. Undesirable harmonics are mitigated by the use of notch filters, snubber circuits, and load capacitors.

An important advantage of the present technology is that it eliminates the need for rectification of the AC power to DC and subsequent inversion from DC back to AC while providing a continuous range of available output voltage levels. That is, the PWM technique used by the present technology to achieve the desired AC output power eliminates the need for a DC power stage while allowing a continuous range of voltage amplification or reduction throughout the operational range of the device. Thus, any desired output voltage level from zero to the autotransformer turns ratio times the input source voltage may be attained by selecting an appropriate switching frequency and pulse width for the complete cycle.

Reduction of the number of switching elements is another advantage of the present technology. DC inverters, for example, typically require a switching element for each polarity (i.e., separate switching elements for the positive and negative portions of the AC voltage), whereas the present technique uses the same switching devices for the positive and negative portions of the AC voltage by embedding each switching devices within a full-bridge rectifier circuit. Corresponding snubber circuits are also connected in parallel with corresponding switching elements and embedded within corresponding full-bridge rectifier circuits, so that only one snubber circuit is deployed for each switching element.

High voltage, low current switching is another advantage of the present technology. Series-connected cascades of switching elements are used to build up to the desired high voltage switching level using relatively low cost, commercially available switching devices. The snubber circuits connected in parallel with each switching element help to evenly divide the line voltage across the cascade of switching elements. Because the switching is done at high voltage, there is significantly less current through the switching elements, which allows the use of lower cost, commercially available switching devices.

Low standby losses when the voltage sag and over-voltage compensation device is not in a control mode is another advantage of the present technology, Because the autotransformer is connected in series in the power circuit only during voltage sag or, over-voltage events (i.e., when the voltage sag and over-voltage compensation device is in a control mode), it does not produce significant continuous. losses (i.e., less than 1%) when the voltage sag and over-voltage compensation device operates in the standby mode.

The avoidance of costly and physically large energy storage devices and the ability to compensation for voltage sags of unlimited duration are additional advantages of the present technology. Because the present technology does not use stored energy to restore the "missing" voltage and power during voltage sag events, the time duration that the present technology can compensate for a voltage sag event is not limited in duration by the size of the energy storage devices. Virtually all AC-DC-AC inverter technologies suffer from this important technical limitation, or they suffer from an extreme increase in control complexity in order to continually charge and discharge the energy storage devices to the proper voltage levels during the voltage sag event. In addition, the elimination of the AC-DC-AC inverter circuitry greatly reduces the required number of switching elements, while the use of full-bridge inverter circuits further reduce the number of switching elements. These advantages of the present technology result in a relatively simple circuit topology, relatively simple control methods, significantly fewer switching elements, substantially lower cost, and better operating performance than prior voltage compensation technologies.

In a first mode of operation, the control unit gates the upper-pole and center-pole switching devices in substantial unison to maintain these switches in opposing configurations. This mode of operation transmits a relatively high amount of power for a given pulse width, but requires non-zero-current switching devices (e.g., IGBTs) on both the center and upper poles. Alternatively, in a second mode of operation, the control unit switches the upper pole out of the circuit (i.e. by-pass mode) during controlled operation, modulates the center pole while the upper pole is held out of the circuit to produce the desired output voltage, and then switches the center pole out and the upper pole back into the circuit at the end of the control operation. This mode of operation transmits less power for a given pulse width, but uses non-zero-current switching devices (e.g., IGBTs) only for the center pole, and permits less expensive zero-current switching devices (e.g., thyristors) to be used for the upper pole.

The voltage sag and over-voltage compensation device typically utilizes a conventional autotransformer with a single winding constructed on a single flux-linking core with a center winding tap, typically in the middle of the winding. However, a two-winding transformer may be configured into an autotransformer by connecting the high pole of the primary winding to the low pole of the secondary, or vice versa, which may be described as "daisy-chaining" the windings. Similarly, transformers with higher numbers of windings may be configured into an autotransformer by daisy-chaining the windings, as described above. Accordingly, the voltage sag and over-voltage compensation device may utilize any type of autotransformer, no matter how many individual windings may be involved. In addition, the turns ratio of the autotransformer is preferably about one-to-two (1:2) (i.e., two winding with the same number of turns, or one winding with a center tap), which results in a nominal input-to-output voltage ratio of one-to-two (1:2) for the voltage sag and over-voltage compensation device. However, the voltage sag and over-voltage compensation device may utilize an autotransformer with a different turns ratio if desired, which results in a difference in the pulse width the required to produce a desired output voltage. Modifications of this sort are well within the skill of those skilled in the electric distribution art.

Those skilled in the art will also appreciate that the voltage sag and over-voltage compensation device may include thyristor or IGBT switching devices, as described above. Nevertheless, the voltage sag and over-voltage compensation device may include other types of switching devices, presently available or developed in the future, that exhibit the desired switching capabilities. Further, the circuit configuration shown for the full-bridge rectifiers, snubbers and notch filter work well for their intended purposes, but may be varied by those skilled in the art so long as the desired functionality may be accomplished. Likewise, variations may be developed to the control schemes described above for the voltage sag and over-voltage compensation device so long as the desired output voltage may be accomplished.

In addition, the present invention may be used to construct voltage sag and over-voltage compensation devices for voltages other than distribution voltages, such as customer delivery voltages, the voltages of specific pieces of equipment, sub-transmission or even transmission voltages provided that electric devices, and in particular primarily switching devices, having the desired characteristics can be constructed. Given the current state of electric power devices, however, distribution voltages are presently the most advantage voltage levels for implementing the voltage sag and over-voltage compensation devices using the present technology.

It should be appreciated that above-described voltage sag and over-voltage compensation device significantly improves over prior voltage compensation devices in that no energy storage devices are required, and over-voltage conditions are not imposed on the load at the conclusion of a voltage sag event. The present technology is much simpler than prior voltage compensation technologies in that it avoids AC-DC-AC power conversion, uses full-bridge rectifiers to reduces the number of active switching elements, and uses well developed autotransformer technology as the basic design element. Cascading the switching elements allows the present technology to switching at high voltage with lower currents. In addition, a single switching frequency with a single pulse width for any given voltage compensation condition makes the control system relatively simple to design and implement. The combination of these advantages results in a comparatively uncomplicated design that exhibits lower cost and higher reliability, while providing improved voltage compensation performance.

Turning now to the figures, in which like numerals refer to like elements throughout the several figures, FIG. 1 is an electric circuit diagram of a three-phase voltage sag and over-voltage compensation device 10 for an AC electric power distribution system. The voltage sag and over-voltage compensation device 10 is typically connected between an electric power distribution substation 12 and a load 14 to be provided with voltage sag and over-voltage protection. To minimize the likelihood of faults occurring downstream from the voltage sag and over-voltage compensation device 10, the device may be physically located as close to the load end as possible, for example on the high-voltage side of the customer's delivery-voltage transformer.

In particular, the voltage sag and over-voltage compensation device 10 may often be pole-mounted adjacent to the customer's pole-mounted delivery-voltage transformer. Each phase of the electric power distribution 16a–c typically includes its own corresponding voltage sag and over-voltage compensation device 18a–c. Although the voltage sag and over-voltage compensation device 10 is shown connected in a "Wye" configuration, it may alternatively be connected in a "Delta" configuration. That is, the voltage sag and over-voltage compensation device 10 is typically connected in a "Wye" configuration for a "Wye" connected distribution circuit, while it is typically connected in a "Delta" configuration for a "Delta" connected distribution circuit.

In addition, in some cases it may be practical to install a voltage sag and over-voltage compensation device 10 near or adjacent to a particularly sensitive piece of equipment, such as a controller for a manufacturing operation, and to operate the device at the service voltage of that piece of equipment. This would allow the voltage compensation device to protect the sensitive piece of equipment from voltage sags and over-voltage conditions caused by other pieces of equipment on the customer's premises. Nevertheless, it is presently anticipated that the many feasible installations of the present technology will be pad-mounted, pole-mounted or underground configurations at distribution line voltages located near a customer's deliver transformer. In particular, it is anticipated that for many installations, a three phase autotransformer may be housed in a first enclosure, and that three phases of switching and snubbers circuits may be located in second enclosure, with both enclosures sized for pad-mounted, pole-mounted or underground installations.

Figure 2:
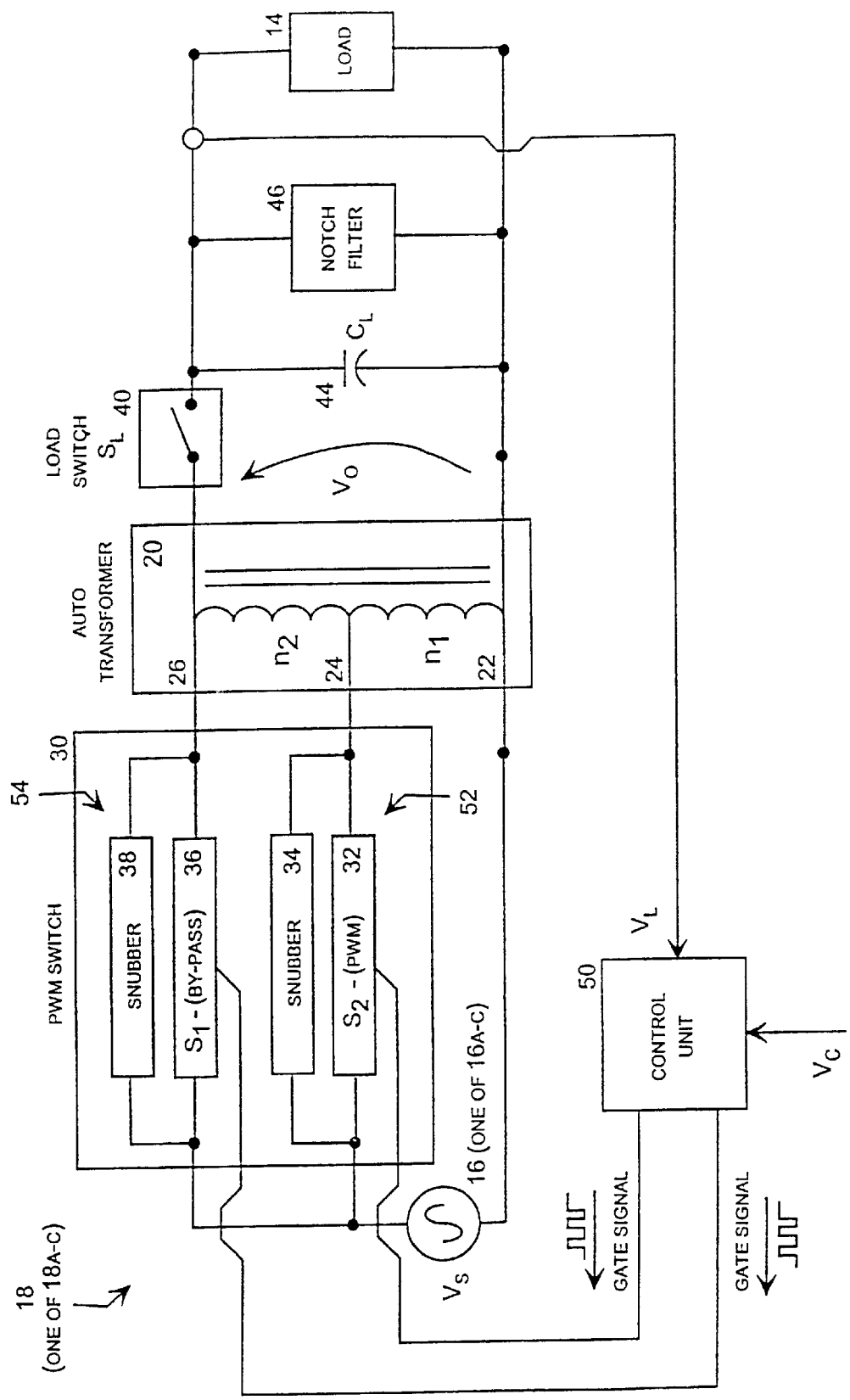
FIG. 2 is an electric circuit diagram of one phase of the three-phase voltage sag and over-voltage compensation device shown in FIG. 1.

FIG. 2 is an electric circuit diagram of one phase of the three-phase voltage sag and over-voltage compensation device 10, (i.e., one of 18a–c), which will be referred to as the "voltage compensation device 18." This voltage compensation device 18 includes an autotransformer 20 functionally coupled to a pulse-width modulation switch 30. The autotransformer 20 includes a lower pole 22, a center pole 24, and an upper pole 26. The pulse-width modulation switch 30 includes a center-pole switch 52 that selectively connects the voltage source 16, typically a corresponding phase 16a–c of the electric power distribution line, between the lower pole 22 and the center pole 24. The center-pole switch 52 includes a center-pole switching device 32 and a center-pole snubber 34 connected in parallel with the center-pole switching device 32. Similady, the pulse-width modulation switch 30 includes an upper-pole switch 54 that selectively connects the voltage source 16 between the lower pole 22 and the upper pole 26. The upper-pole switch 54 includes an upper-pole switching device 36 and an upper-pole snubber 38 that is connected in parallel with the upper-pole switching device 36.

The voltage compensation device 18 also includes a load switch 40 that is shown on the load side of the autotransformer 20 for the purpose of illustrating the operating conditions of the voltage compensation device 18 when it is loaded (i.e., connected to the load 14) and when it is not loaded (i.e., not connected to the load 14). That is, the load switch 40 may not actually be implemented as part of the voltage compensation device 18, but its presence is useful for the purpose of describing the loaded and no-load operating principles of the device.

On the output side, the voltage compensation device 18 includes a load capacitor 44 connected in parallel with the load 14 to smooth the voltage-corrected AC power supply toward a sinusoidal power supply at the system frequency. The load capacitor 44 may alternatively be described as being connected between the upper pole 26 and the lower pole 22 of the autotransformer 20. The voltage compensation device 18 also includes a notch filter 46 connected in parallel with the load 14 to remove noise created by the switching elements. Again, the notch filter 46 may alternatively be described as being connected between the upper pole 26 and the lower pole 22 of the autotransformer 20. The voltage compensation device 18 also includes a control unit 50 for selectively gating the upper-pole switch 54 and the center-pole switch 52 to generate a desired output voltage ($V_O$) between the upper pole 26 and the lower pole 22 of the autotransformer 20. Typically, the control unit 50 receives a control signal corresponding to the measured load voltage ($V_L$) as a control variable, and operates to reduce the error between this signal and a computed or received control voltage ($V_C$), which represents the desired output voltage of the voltage compensation device 18. Specifically, the control unit 50 may compute the control voltage ($V_C$) based a measurement of the source voltage ($V_S$) and a pre-set peak voltage level, look it up in a storage location, or receive it from a remote location.

Figure 3:
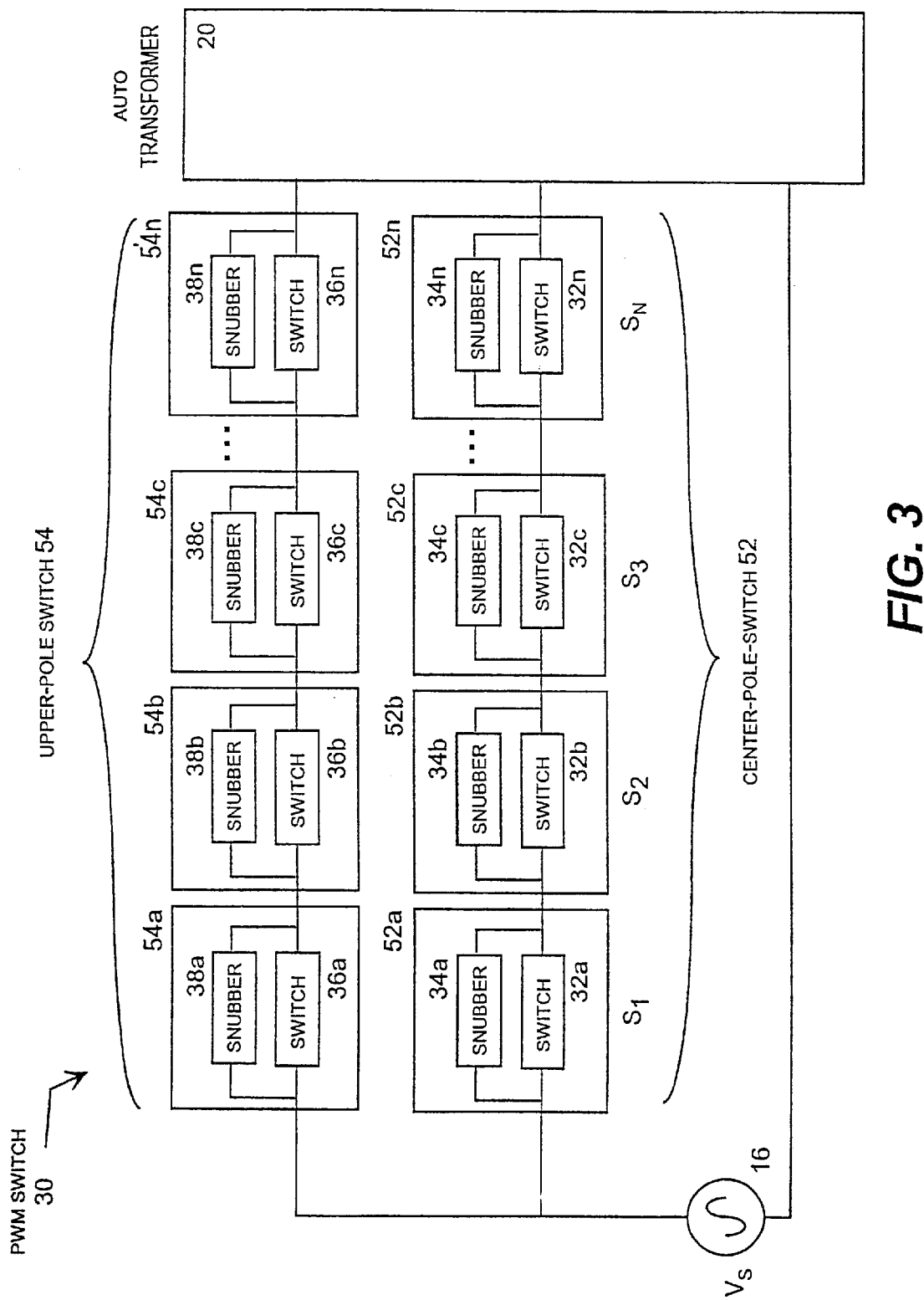
FIG. 3 is an electric circuit diagram of cascade switching devices in a voltage sag and over-voltage compensation device.

FIG. 3 is an electric circuit diagram of the pulse-width modulation switch 30, which is preferably implemented as two parallel sets or cascades of series-connected switches 52a–n and 54a–n. One of the cascades 52a–n forms the center-pole switch 52, while the other cascade 54a–n forms the upper-pole switch 54. The cascade switching approach is appropriate because the voltage levels used for electric power distribution are typically higher than the threshold voltages that conventional IGBT and thyristor switching devices can withstand without breaking down (i.e., unintended conduction of current). Therefore, the upper-pole switch 54 and center-pole switch 52 are each constructed form a cascade of series-connected switches ($S_1$–$S_n$) in which the total switching voltage is relatively evenly distributed among the switches of the cascade. More specifically, each stage of the center-pole cascade 52a–n includes a substantially identical switching device 32a–n, each with a respective parallel-connected snubber 34a–n. Each switching device 32a–n is typically operated simultaneously, for example from the same gating signal. The substantially identical snubbers 34a–n help to evenly divide the total switching voltage relatively evenly across the corresponding switches 32a–n. Similarly, each stage of the upper-pole cascade 54a–n includes a substantially identical switching device 36a–n, each with a respective parallel-connected snubber 38a–n. Again, each switching device is typically operated simultaneously, for example from the same gating control signal, and the substantially identical snubbers 38a–n help to evenly divide the voltage across the corresponding switching devices 36a–n.

Figure 4:
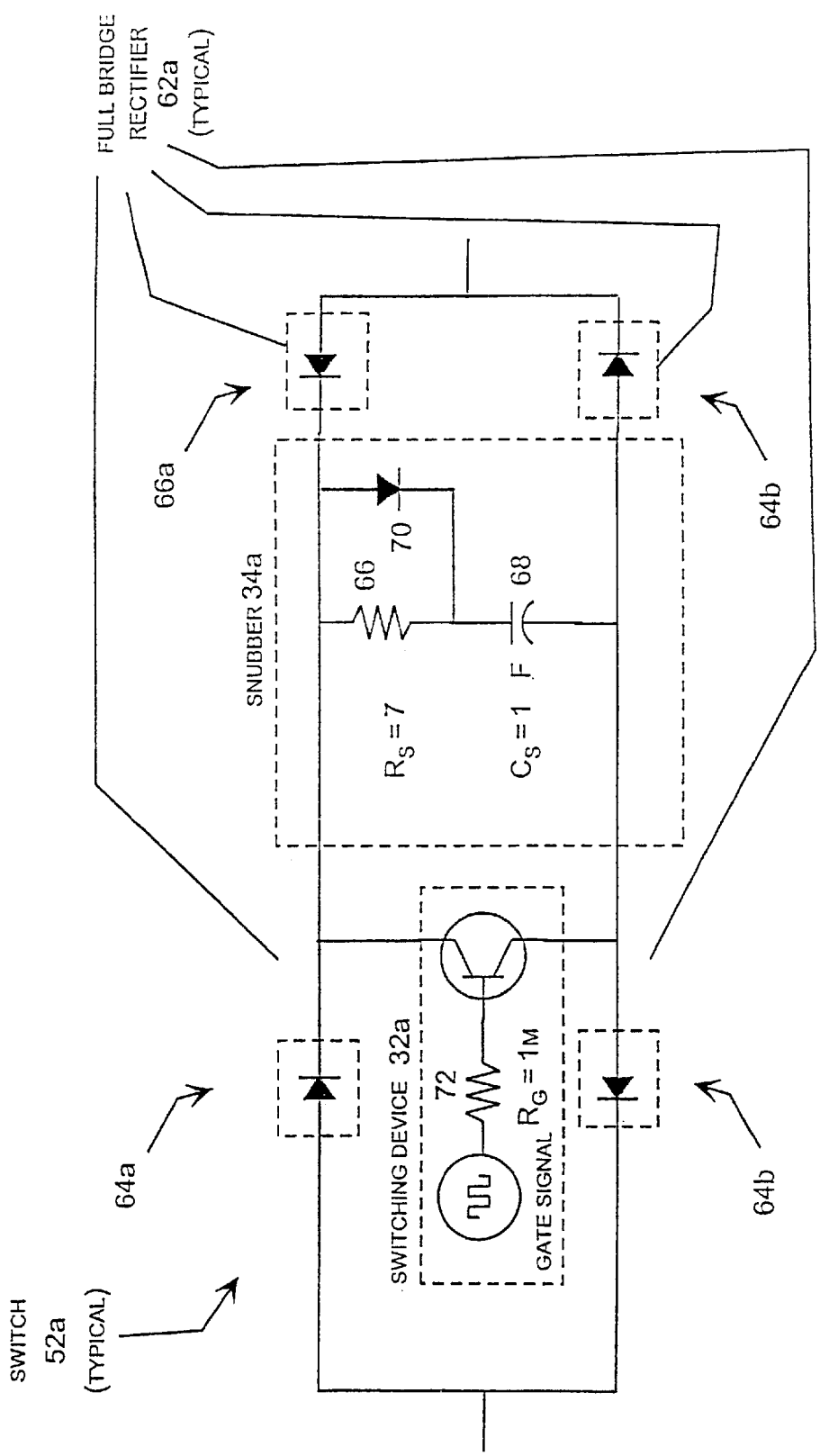
FIG. 4 is an electric circuit diagram of a switching device and snubber located in a full-bridge rectifier in a voltage sag and over-voltage compensation device.

FIG. 4 is an electric circuit diagram of an illustrative switch 52a, which includes a switching device 32a and snubber 34a located within a full-bridge rectifier 62a. That is, each switch 52a–n and 54a–n contains a corresponding switching device and parallel connected snubber located within a respective full-bridge rectifier, which is represented by the typical full-bridge rectifier 62a shown in FIG. 4. The full-bridge rectifier 62a allows bi-directional switching through the switching element 32a (i.e., switching through the same switching element 32a during the positive and negative portions of the AC voltage cycle). The full-bridge rectifier 62a includes opposing parallel-connected sets of reverse-polarity diodes 64a–b and 66a–b, as is familiar to those skilled in the art. The switching device 32a and snubber 34a are connected in parallel in the center of the full-bridge rectifier 62a, between diode sets 64a–b and 66a–b. This is a typical circuit arrangement that may apply for all of the switch 52a–n and 54a–n. As shown in FIG. 3 in view of FIG. 4, a cascade of full-bridge rectifier circuits with embedded switching elements and snubbers selectively connect the voltage source 16 to the center pole 24 or the upper pole 26 of the autotransformer 20. However, it should be appreciated that the snubbers 38a–n may be eliminated or replaced by less expensive voltage dividing circuitry for the upper-pole switches 54a–n when these devices are thyristors or other switching devices that can only switch under zero-current conditions.

Each snubber, as represented by the snubber 34a, typically includes a snubber resistor 66 and a snubber capacitor 68 connected in series and a snubber diode 70 connected in parallel with the snubber resistor. One of ordinary skill in the art may select the ratings and unit specifications for these elements to be appropriate for the particular application. For example, for a 12.5 kV, 25 mVA distribution circuit, the devices might be rated for 12.5 kV, 25 mVA and the snubber resistor 66 may be a seven Ohm resistor ($R_S=7\Omega$), and the snubber capacitor 68 may be a thirty five micro-Farad capacitor ($C_S=35\ \mu F$). In addition, the gating resistor 70 shown in FIG. 4 may be one million Ohms ($R_G=1M\Omega$).

A is an electric circuit diagram of a notch filter 46 for the voltage compensation device 18. To remove noise created by gating the switching elements at a gating frequency, typically one thousand Hertz (1 kHz), the voltage compensation device 18 includes the notch filter 46 connected between the neutral pole 22 and the upper pole 26 of the autotransformer 20, as shown in FIG. 2. The notch filter 46 is preferably configured to reduce power disturbances occurring in the voltage-corrected AC power supply within a filter frequency range about the gating frequency. Specifically, the notch filter may include a filter inductor 80 with a value of five milli-Henries ($L_F=5\ mH$), a filter resistor 82 with a value of one Ohm ($R_F=1\Omega$), and a filter capacitor 84 with a value of five micro-Farads ($C_F=5\ \mu F$) connected in series.

In another embodiment exhibiting acceptable performance characteristics, the snubber resistor 66 may be a seven Ohms ($R_S=7\Omega$), the snubber capacitor 68 may be a thirty five micro-Farads ($C_S=35\ \mu F$), the gating resistor 70 may be one million Ohms ($R_G=1M\Omega$), the filter inductor 80 may be ten milli-Henries ($L_F=10\ mH$), the filter resistor 82 may be seven Ohms ($R_F=7\Omega$), and the filter capacitor 84 may be five micro-Farads ($C_F=5\ \mu F$). Again, one of ordinary skill in the art may select the ratings and unit specifications for the circuit elements to be appropriate for any particular application.

FIG. 5B is a voltage waveform diagram illustrating the output voltage 90 of the voltage compensation device 18 without the notch filter 46 in the circuit. This output voltage waveform diagram is compared to the input voltage 92 (i.e., $V_S$) to illustrate the ripples that occur in the output voltage 90 caused by gating the switching elements at a gating frequency, typically one thousand Hertz (1 kHz), without the notch filter 46 in the circuit. FIG. 5C is a voltage waveform diagram illustrating the output voltage 94 of voltage compensation device 18 with the notch filter 46 in the circuit. As shown, in FIG. 5C, the notch filter 46 significantly reduces the ripples in the output voltage 94, as compared to those occurring in the output voltage 90 shown in FIG. 5B.

Figure 6:
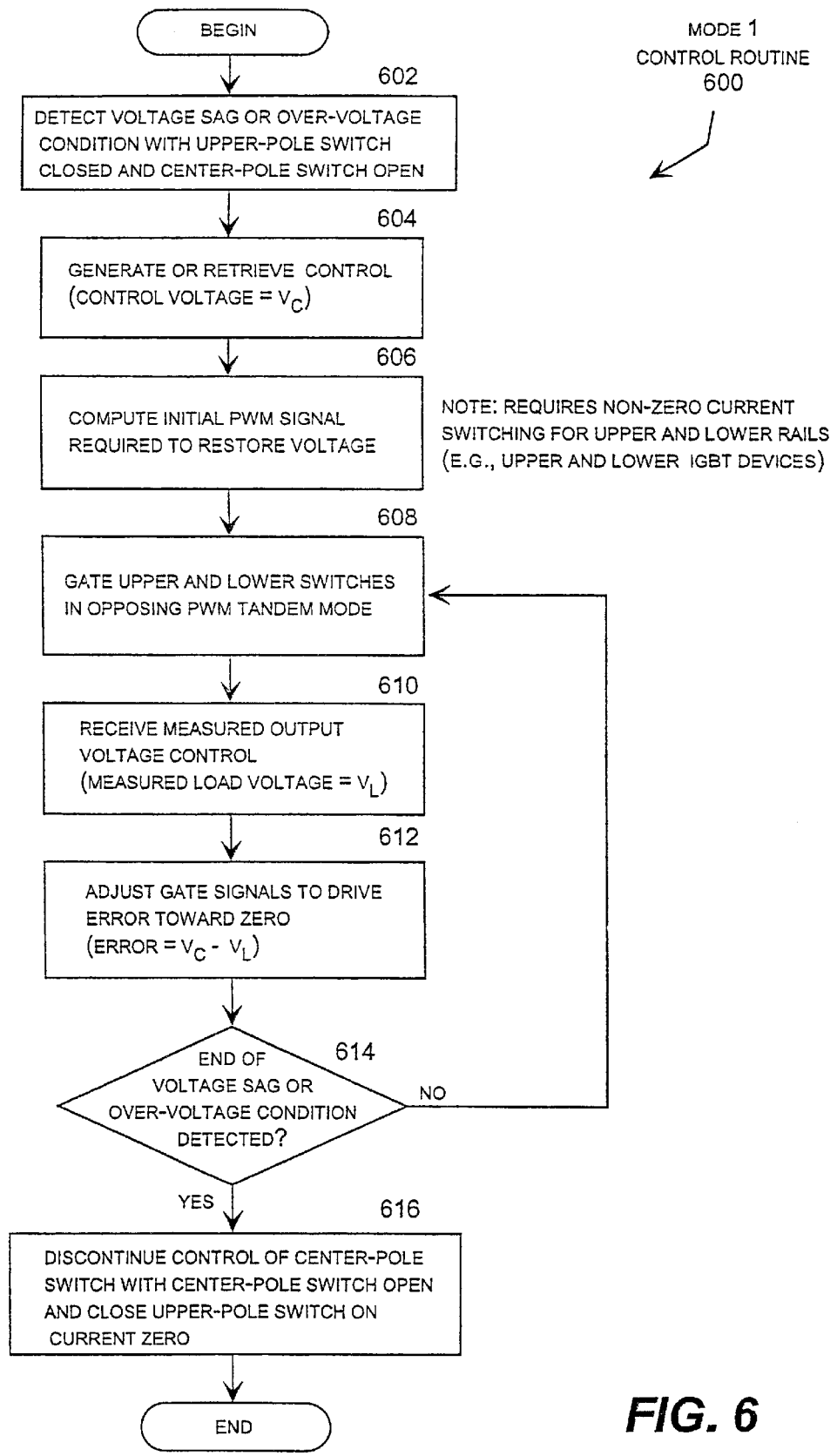
FIG. 6 is a logic flow diagram for a first mode of operating a voltage sag and over-voltage compensation device.

FIG. 6 is a logic flow diagram for routine 600 for a first mode of operating the voltage compensation device 18. For convenience, the following description of control routine 600 will refer to the elements shown on FIG. 2. Control routine 600 begins in step 602, in which the control unit 50 detects a voltage sag or over-voltage condition in a real-time measurement of the load voltage ($V_L$). This step 602 occurs with the upper-pole switch 54 closed and the center-pole switch 52 open, which is the non-control or "stand-by" condition of the voltage compensation device 18. Step 602 is followed by step 604, in which the control unit 50 generates or receives a desired nominal control voltage ($V_C$), such as a one per-unit sinusoidal output voltage at the nominal voltage. and desired phase angle. Step 604 is followed by step 606, in which the control unit 50 computes an initial pulse-width modulated gating signal to restore the load voltage ($V_L$) to the desired nominal control voltage ($V_C$). Step 606 is followed by step 608, in which the control unit 50 gates the center-pole switch 52 and the upper-pole switch 54 in substantial unison to maintain these switches in opposing configurations. That is, the. control unit 50 gates the center-pole switch 52 off when it gates the upper-pole switch 54 on, and vice versa, throughout the control period.

Step 608 is followed by step 610, in which the control unit 50 receives a real-time control signal indicating a measured value for the load voltage ($V_L$). Step 610 is followed by step 612, in which the control unit 50 adjusts the gating signal to drive the error between the measured load voltage ($V_L$) and the control voltage ($V_C$) toward zero. Step 612 is followed by step 614, in which the control unit 50 determines whether an end of the voltage sag or over-voltage event has occurred. If an end of the voltage sag or over-voltage event has not been detected, the "NO" branch loops back to step 608, and the control operation continues. If an end of the voltage sag or over-voltage event has been detected, the "YES" branch is followed to step 616, in which the control unit 50 discontinues control operation. Specifically, the control unit 50 switches the center-pole switch 52 open and switches the upper-pole switch 54 closed on the next occurring zero-current condition. Step 616 is followed by the "END" step, which indicates the conclusion of routine 600.

Figure 7:
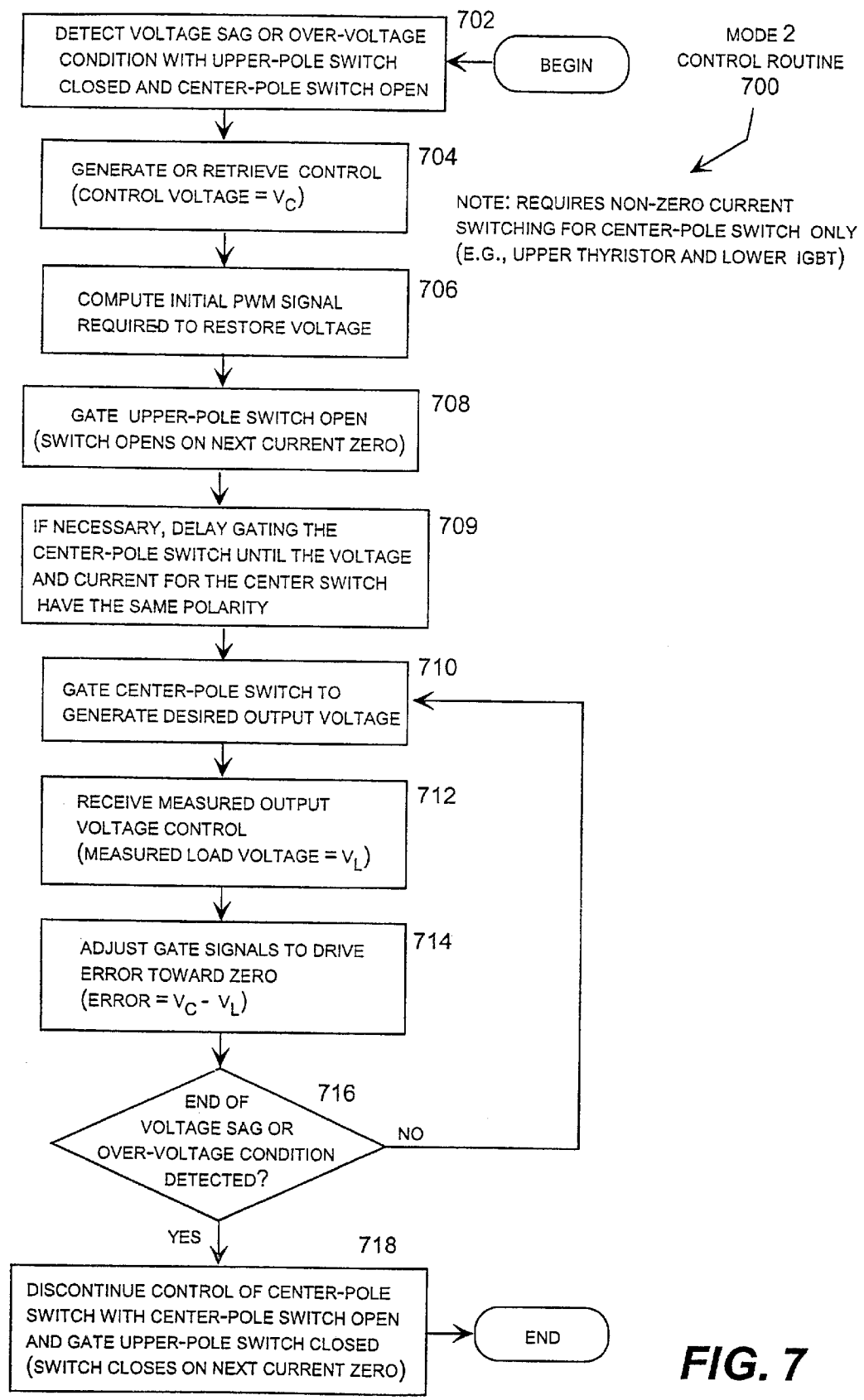
FIG. 7 is a logic flow diagram for a second mode of operating a voltage sag and over-voltage compensation device.

FIG. 7 is a logic flow diagram for routine 700 for a second mode of operating the voltage compensation device 18. For convenience, the following description of control routine 700 will refer to the elements shown on FIG. 2. Control routine 700 begins in step 702, in which the control unit 50 detects a voltage sag or over-voltage condition in a real-time measurement of the load voltage ($V_L$). This step 602 occurs with the upper-pole switch 54 closed and the center-pole switch 52 open, which is the non-control or "stand-by" condition of the voltage compensation device 18. Step 702 is followed by step 704, in which the control unit 50 generates or receives a desired nominal control voltage ($V_C$), such as a one per-unit sinusoidal output voltage at the nominal voltage and desired phase angle. Step 704 is followed by step 706, in which the control unit 50 computes an initial pulse-width modulated gating signal to restore the load voltage ($V_L$) to the desired nominal control voltage ($V_C$). Step 706 is followed by step 708, in which the control unit 50 gates the upper-pole switch 54 open, which causes the upper-pole switch to open on the next occurring zero-current condition. This places the upper pole in a by-pass mode. Step 708 is followed by step 709, in which the control unit 50 delays gating the center-pole switch 52 until the voltage and current through this switch have the same polarity, if necessary. Step 709 is followed by step 710, in which the control unit 50 gates the center-pole switch 52 to produce the desired load voltage ($V_L$). That is, the upper-pole switch 54 is used as a by-pass, and the center-pole switch 52 is gated to produce the desired load voltage ($V_L$), during the control operation.

Step 710 is followed by step 712, in which the control unit 50 receives a real-time control signal indicating a measured value for the load voltage ($V_L$). Step 712 is followed by step 714, in which the control unit 50 adjusts the gating signal to drive the error between the measured load voltage ($V_L$) and the control voltage ($V_C$) toward zero. Step 714 is followed by step 716, in which the control unit 50 determines whether an end of the voltage sag or over-voltage event has occurred. If an end of the voltage sag or over-voltage event has not been detected, the "NO" branch loops back to step 710, and the control operation continues. If an end of the voltage sag or over-voltage event has been detected, the "YES" branch is followed to step 718, in which the control unit 50 discontinues control operation. Specifically, the control unit 50 gates the center-pole switch 52 open and gates the upper-pole switch 54 closed, which causes the upper-pole switch to close on the next occurring zero-current condition. This ends the bypass mode for the upper-pole switch 54. Step 718 is followed by the "END" step, which indicates the conclusion of routine 700.

Figure 8:
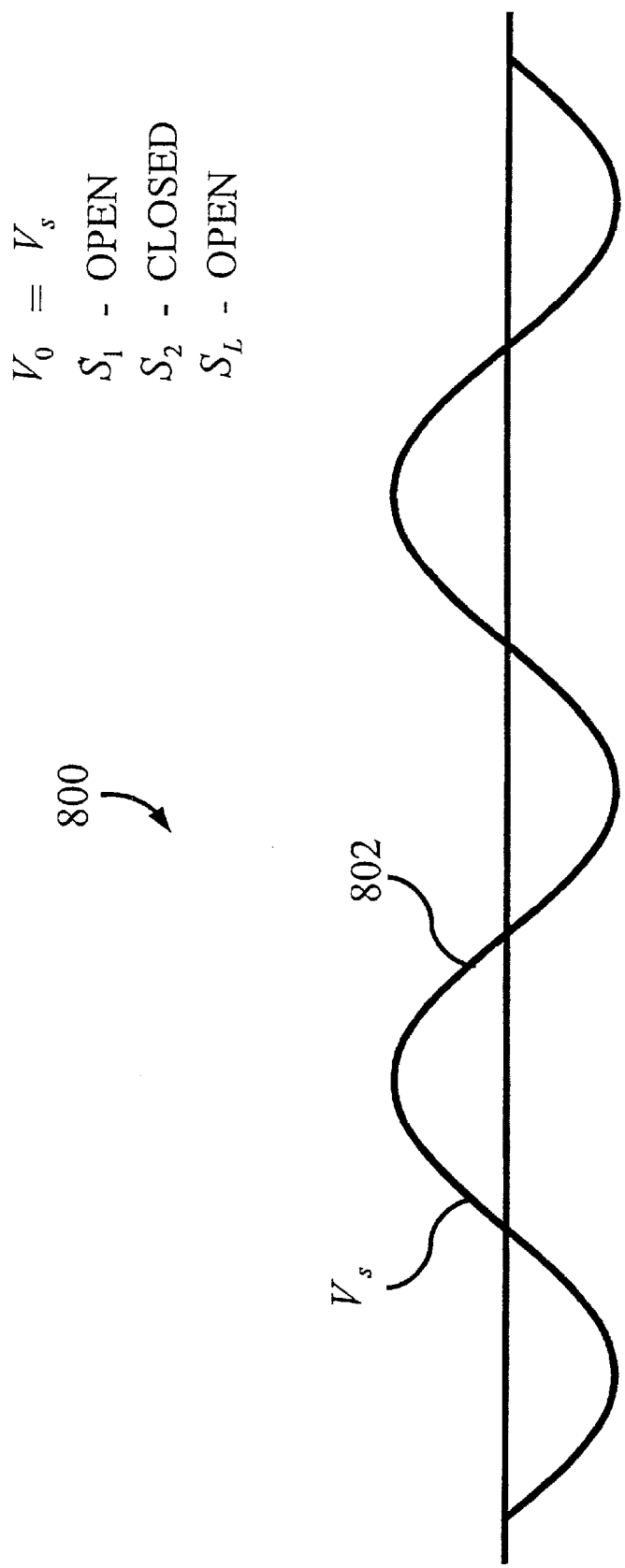
FIG. 8 is a voltage waveform diagram illustrating an input source voltage for a voltage sag and over-voltage compensation device.

FIGS. 8–16 are voltage waveform diagrams illustrating the operation of the voltage compensation device 18 during the first and second operating modes described above. For convenience, the following description of FIGS. 8–16 will refer to the elements shown on FIG. 2. FIG. 8 is a voltage waveform diagram 800 illustrating the source voltage 802 ($V_S$) (e.g., the line voltage for one of lines 16a–c) for the voltage compensation device 18. Typically, the source voltage 802 ($V_S$) will nominally be a one per-unit sinusoidal waveform that may experience voltage sag or over-voltage events from time to time. The purpose of the voltage compensation device 18 is to compensate for these voltage sags or over-voltage so that the voltage at the load 14 ($V_L$) will not experience the voltage sag or over-voltage events.

Figure 9:
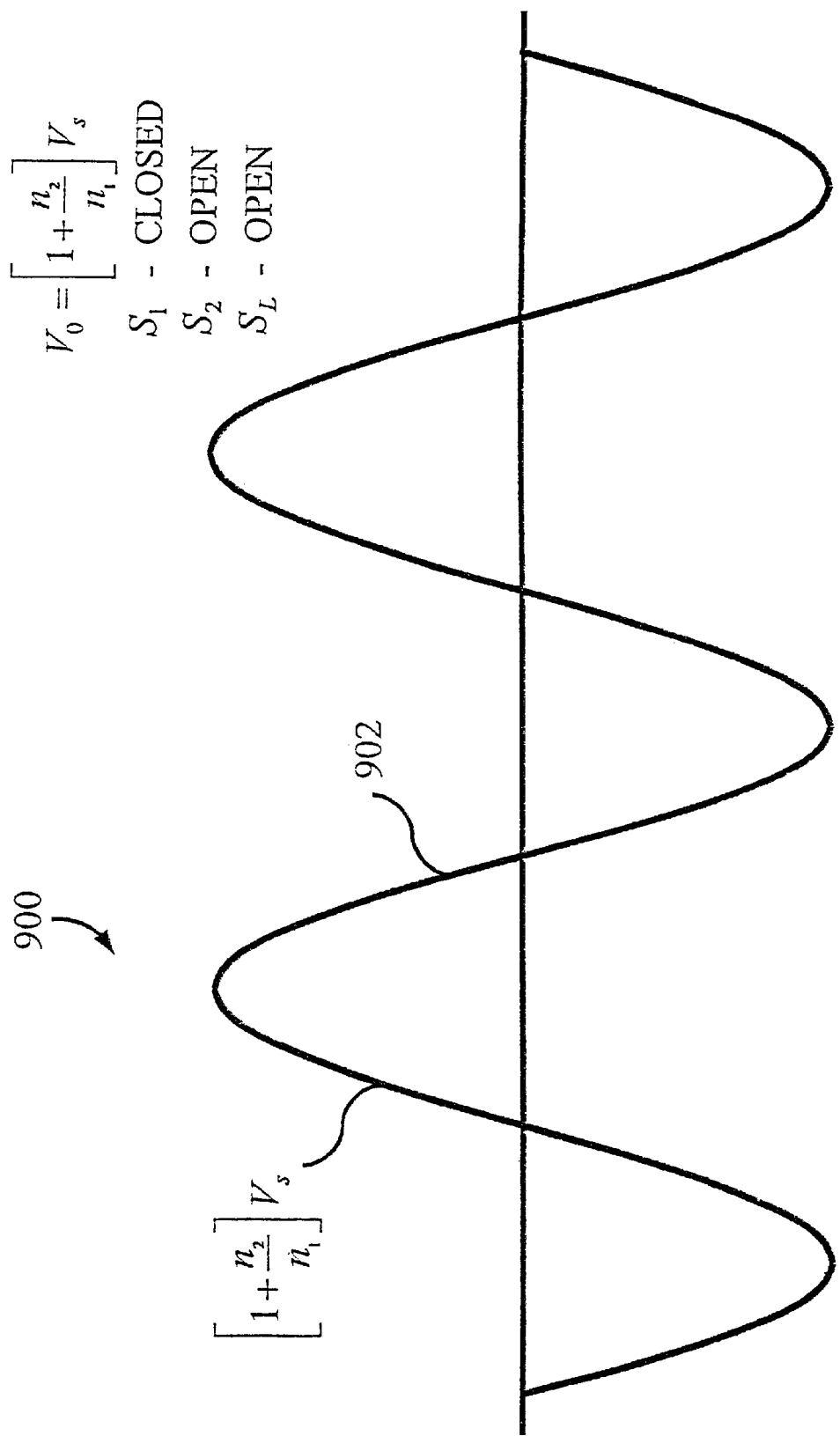
FIG. 9 is a voltage waveform diagram illustrating an unswitched output voltage for a voltage sag and over-voltage compensation device.

FIG. 9 is a voltage waveform diagram 900 illustrating an unswitched output voltage 902 ($V_O$) for the voltage compensation device 18. That is, output voltage 902 ($V_O$) represents the voltage between the lower pole 22 and the upper pole 26 of the autotransformer 20 when the center-pole switch 52 ($S_1$) is closed, the upper-pole switch 54 ($S_2$) is open, and the load switch 40 ($S_L$) is open. As shown, the output voltage 902 ($V_O$) is substantially equal to the source voltage 802 ($V_S$) multiplied by the turns ratio of the autotransformer 20, $[(n_1+n_2)/n_1]$, where $n_1$ represents the number of turns between the lower pole 22 and the center pole 24 of the autotransformer 20 and where $n_2$ represents the number of turns between the center pole 24 and the upper pole 26 of the autotransformer 20.

Figure 10:
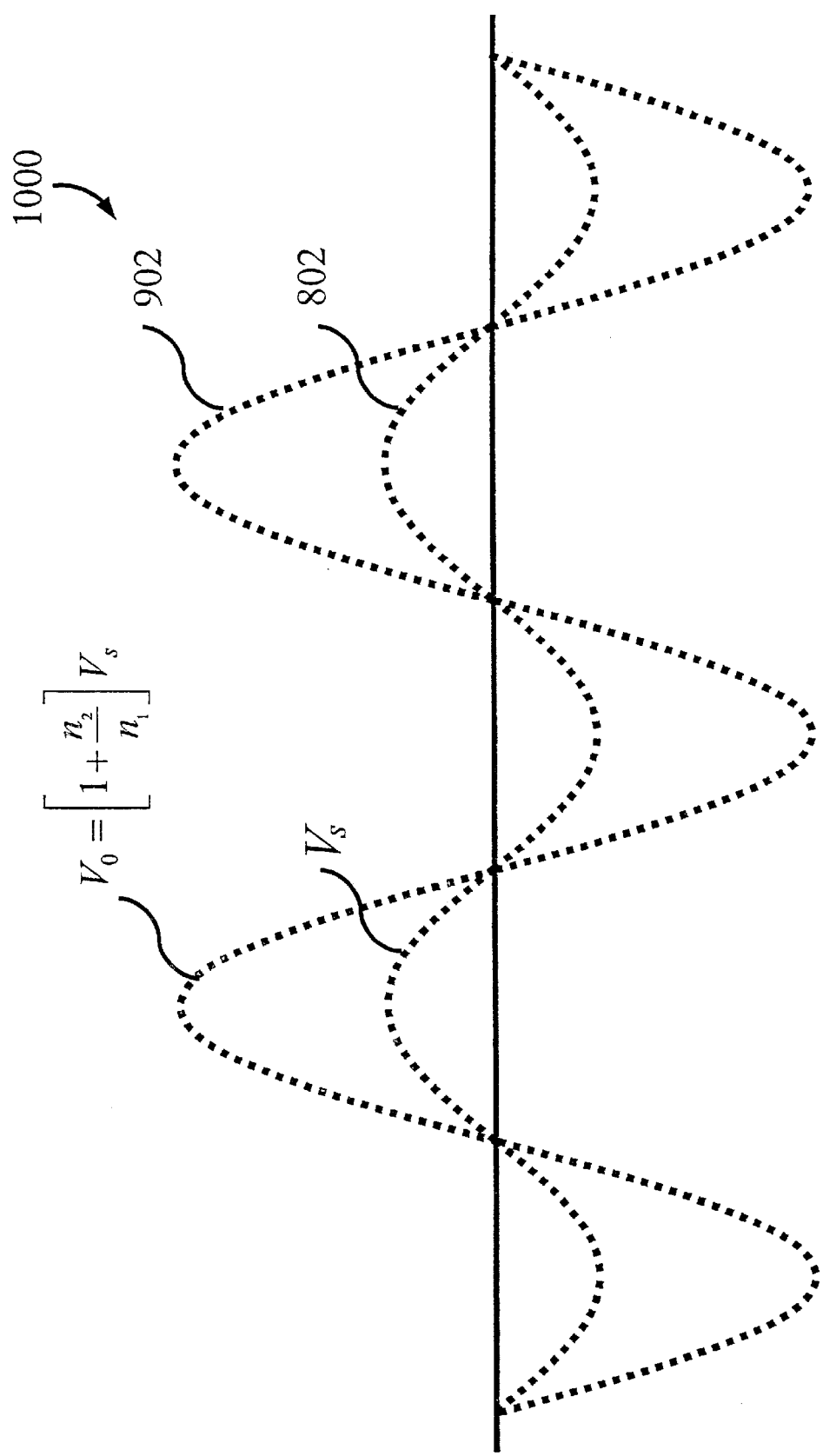
FIG. 10 is a voltage waveform diagram comparing the input source voltage to the unswitched output voltage for a voltage sag and over-voltage compensation device.
Figure 11:
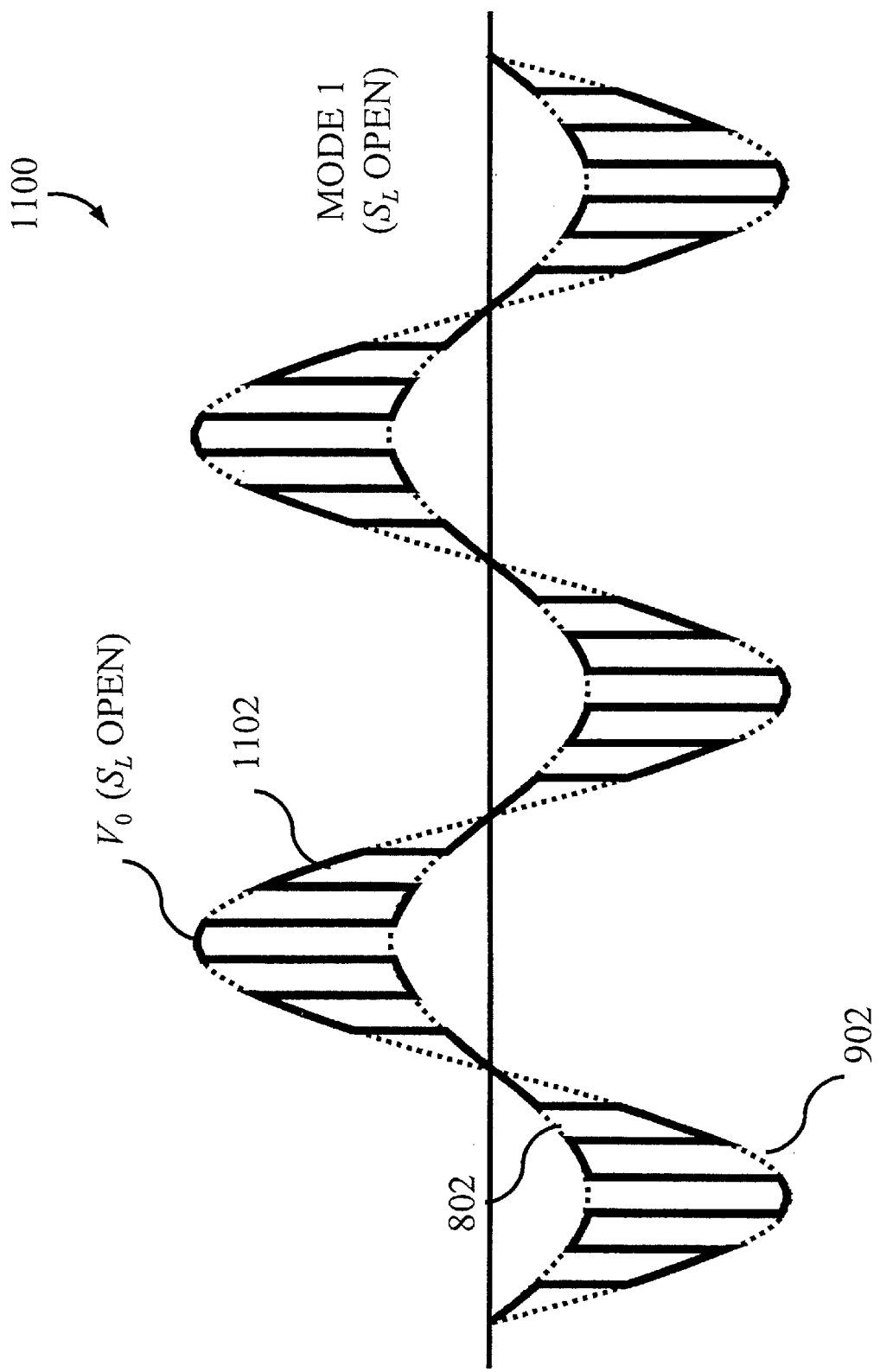
FIG. 11 is a voltage waveform diagram illustrating a no-load switched output voltage in a first operating mode for a voltage sag and over-voltage compensation device, including phantom lines.
Figure 12:
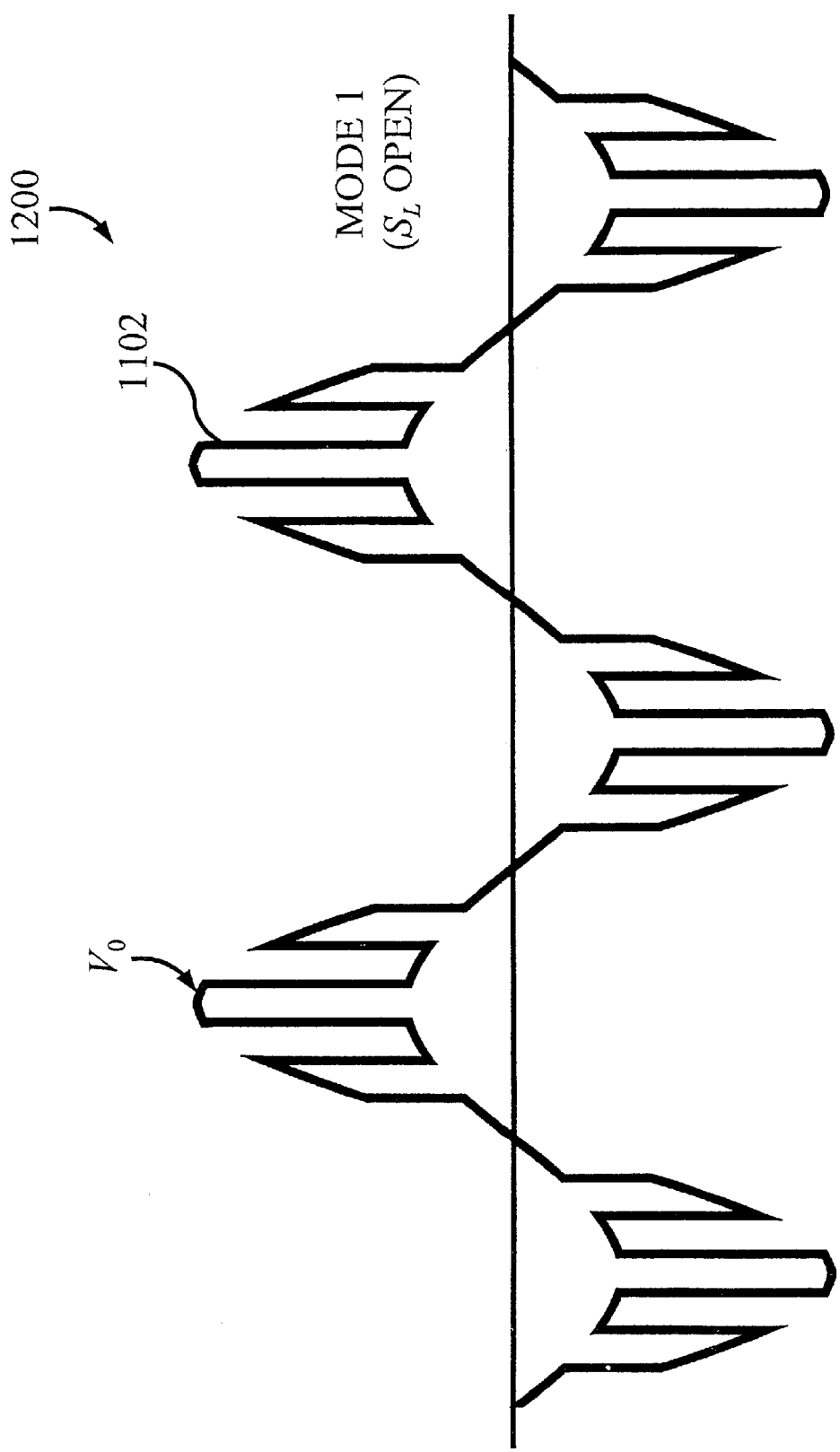
FIG. 12 is a voltage waveform diagram illustrating the no-load switched output voltage in a first operating mode for a voltage sag and over-voltage compensation device, without phantom lines.

FIG. 10 is a voltage waveform diagram 1000 comparing the source voltage 802 ($V_S$) to the unswitched output voltage 902 ($V_O$), which are shown in phantom lines. FIG. 11 is a voltage waveform diagram 1100 illustrating the no-load switched output voltage 1102 ($V_O$) in a first operating mode for a the voltage compensation device 18. This first operating mode corresponds to control routine 600 described previously with reference to FIG. 6. That is, output voltage 1102 ($V_O$) represents the voltage between the lower pole 22 and the upper pole 26 of the autotransformer 20 when the center-pole switch 52 ($S_1$) and the upper-pole switch 54 ($S_2$) are switched in substantial unison to maintain these switches in opposing configurations, and the load switch 40 ($S_L$) is open, As shown in FIG. 11, the switching operation causes the output voltage 1102 ($V_O$) to alternate between the voltage waveforms 802 and 902, which are shown in phantom lines. More specifically, the output voltage 1102 ($V_O$) follows the voltage waveform 802 when the center-pole switch 52 ($S_1$) is switched off and the upper-pole switch 54 ($S_2$) is switched on. Alternatively, the output voltage 1102 ($V_O$) follows the voltage waveform 902 when the center-pole switch 52 ($S_1$) is switched on and the upper-pole switch 54 ($S_2$) is switched off. For clarity, FIG. 12 is a voltage waveform diagram 1200 illustrating the resulting no-load switched output voltage 1102 ($V_O$) in the first operating mode, without phantom lines.

Figure 13:
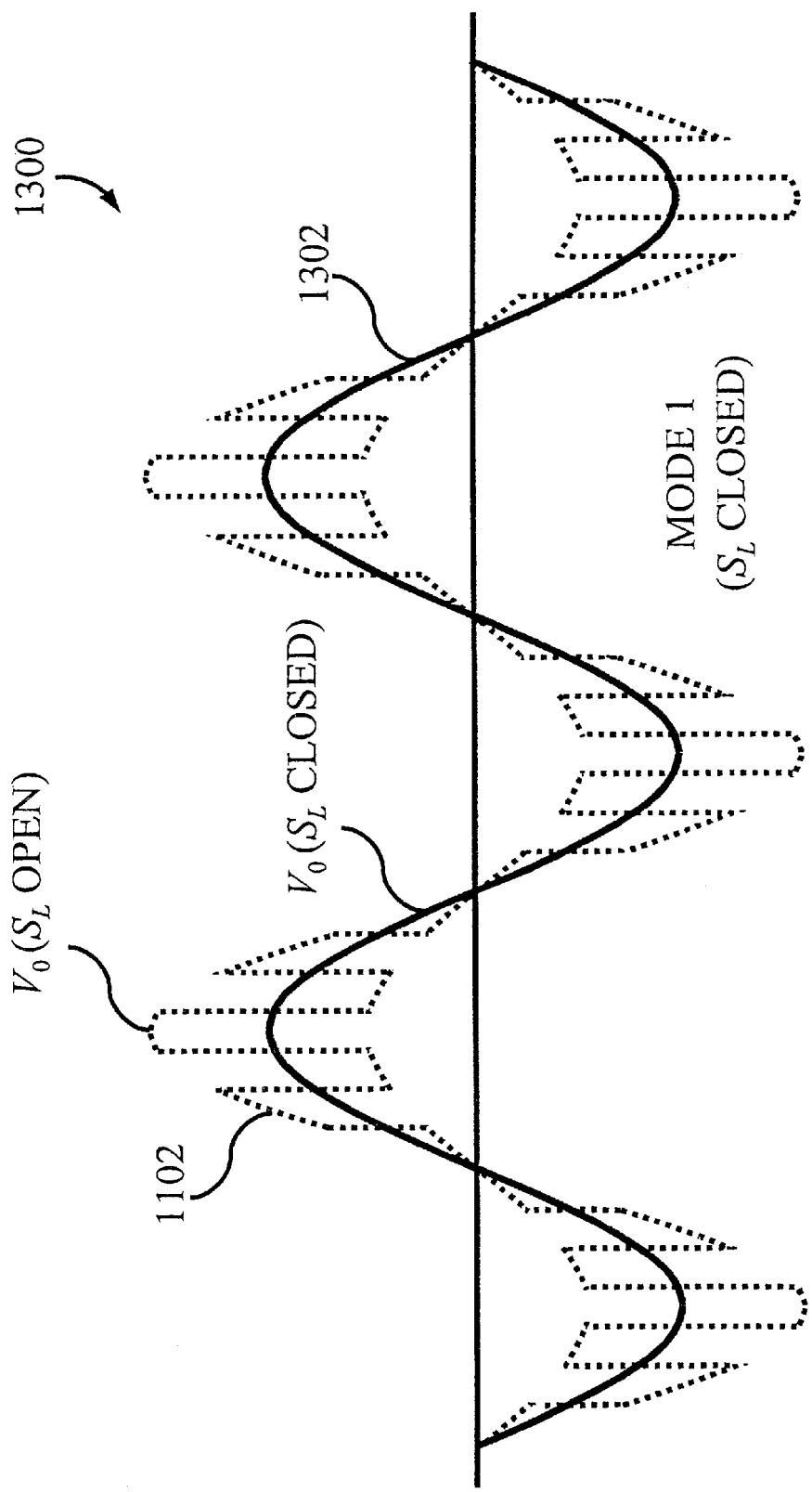
FIG. 13 is a voltage waveform diagram illustrating the load-connected switched output voltage in a first operating mode for a voltage sag and over-voltage compensation device.

FIG. 13 is a voltage waveform 1300 diagram illustrating the load-connected switched output voltage 1302 ($V_O$) for the first operating mode for the voltage compensation device 18. That is, FIG. 13 illustrates the output voltage 1302 ($V_O$) after the load switch 40 ($S_L$) is closed, which brings the load capacitor 44, the notch filter 46, and the load 14 into the circuit in parallel with the autotransformer 20. The no-load switched output voltage 1102 ($V_O$) is shown as a phantom line for comparison purposes. As shown in FIG. 13, closing the load switch 40 ($S_L$) drives the output voltage 1302 ($V_O$) toward a one per-unit sinusoidal waveform, representing a compensation for the voltage sag or over-voltage condition occurring in the source voltage 802 ($V_S$). It should be appreciated that load capacitor 44 carries and smoothes substantially all of the load current in this mode of operation. Those skilled in the art will appreciate that area under the curve 1102 is the same as the area under the curve 1302, which allows the peak level of the output voltage 1302 ($V_O$) to be adjusted by controlling the pulse-width modulation scheme for gating the switches 52, 54.

Figure 14:
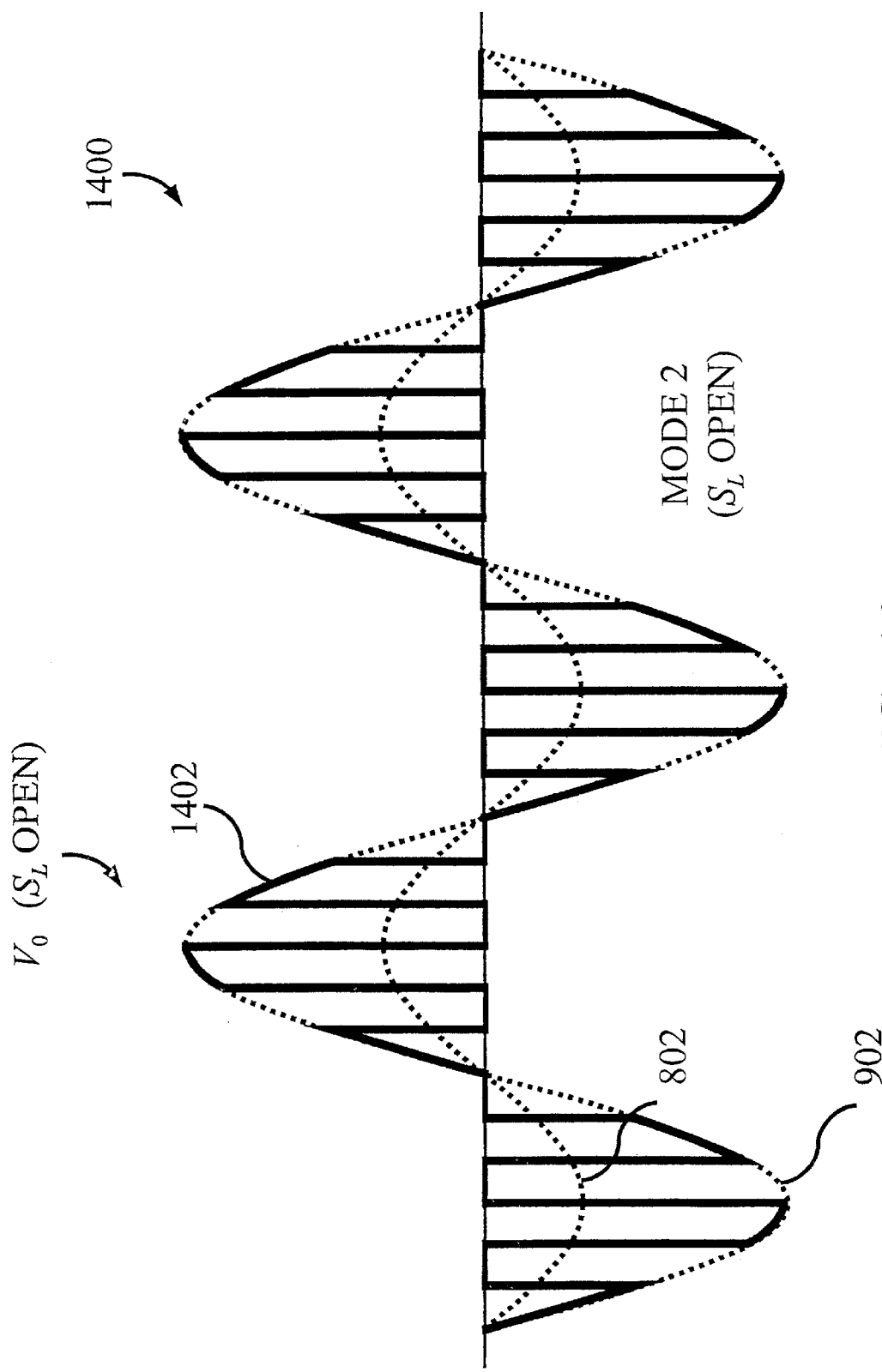
FIG. 14 is a voltage waveform diagram illustrating the no-load switched output voltage in a second operating mode for a voltage sag and over-voltage compensation device, including phantom lines.

FIG. 14 is a voltage waveform diagram 1100 illustrating the no-load switched output voltage 1402 ($V_O$) in a second operating mode for a voltage compensation device 18. This second operating mode corresponds to control routine 700 described previously with reference to FIG. 7. That is, the output voltage 1402 ($V_O$) represents the voltage between the lower pole 22 and the upper pole 26 of the autotransformer 20 when the upper-pole switch 54 ($S_2$) is held open (i.e., by-pass mode) and the center-pole switch 52 ($S_1$) is gated to produce the desired output voltage ($V_O$). As shown in FIG. 14, the switching operation causes the output voltage 1402

Figure 15:
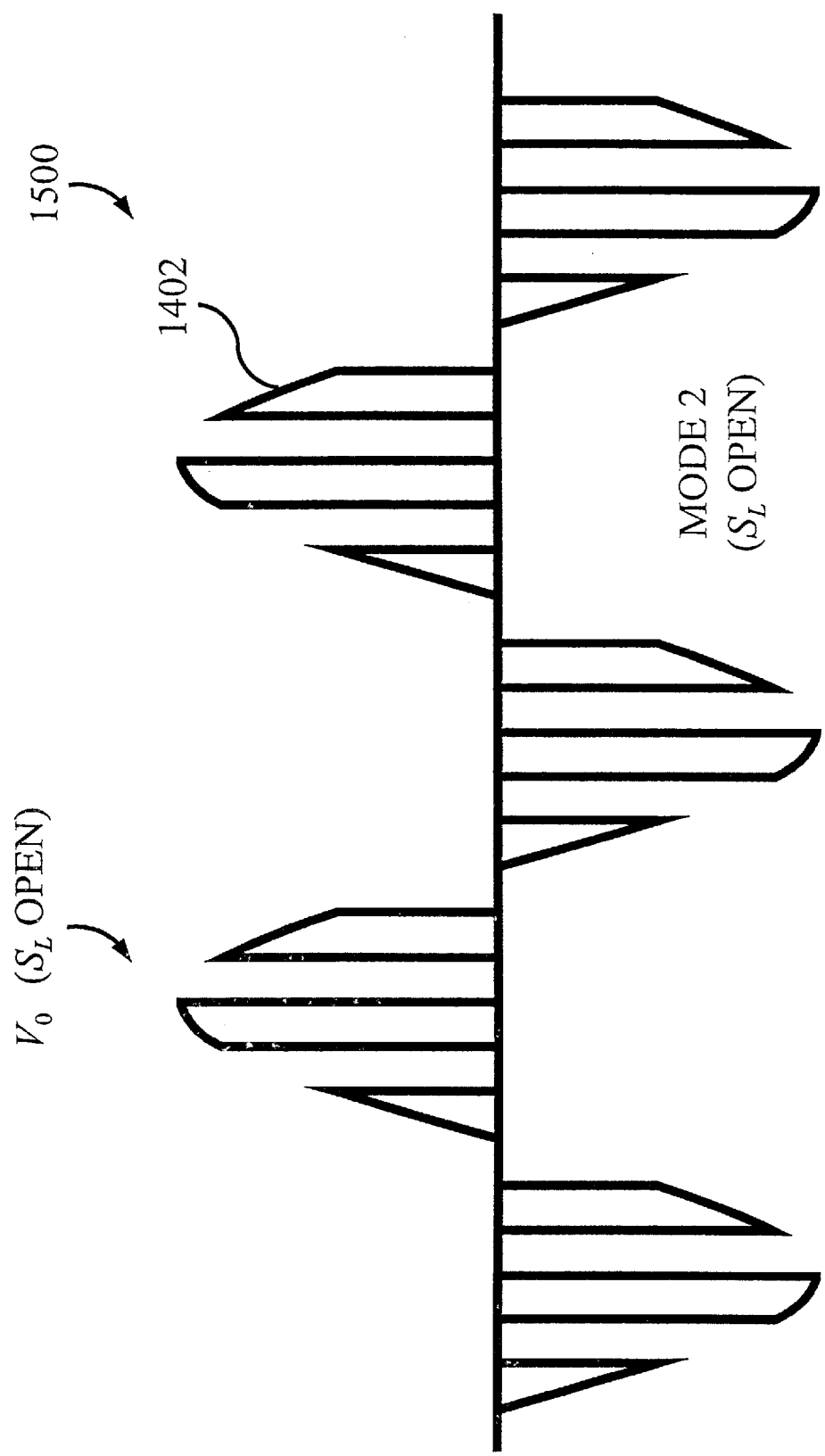
FIG. 15 is a voltage waveform diagram illustrating the no-load switched output voltage in the second operating mode for a voltage sag and over-voltage compensation device, without phantom lines.

($V_O$) to alternate between the voltage waveform and 902, which is shown as a phantom line, and zero voltage. More specifically, the output voltage 1402 ($V_O$) follows the voltage waveform 902 when the center-pole switch 52 ($S_1$) is switched on, and zero voltage when the center-pole switch 52 ($S_1$) is switched off. For clarity, FIG. 15 is a voltage waveform diagram 1500 illustrating this no-load switched output voltage 1402 ($V_O$) in the second operating mode, without phantom lines.

Figure 16:
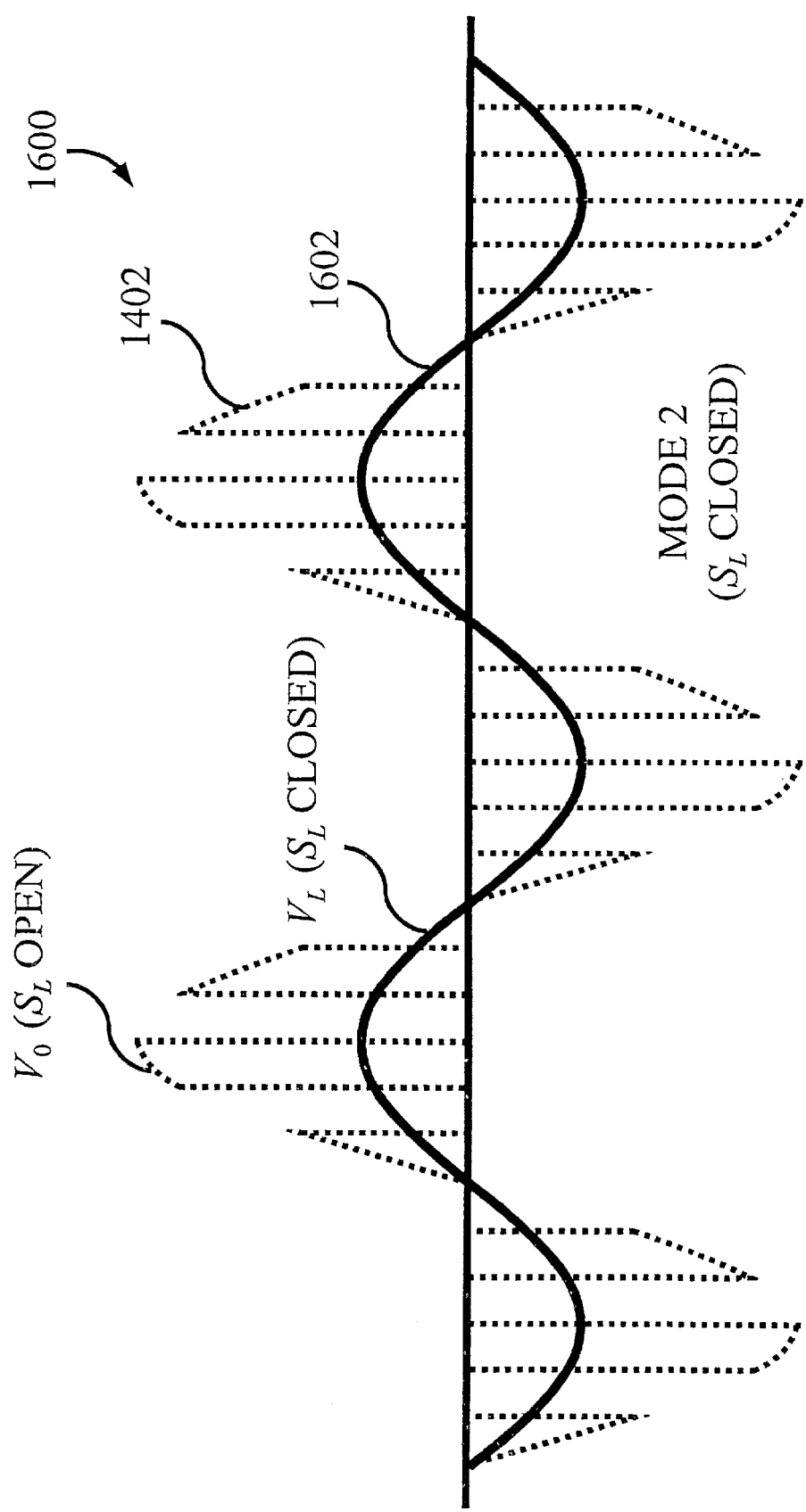
FIG. 16 is a voltage waveform diagram illustrating the load-connected switched output voltage in a second operating mode for a voltage sag and over-voltage compensation device.

FIG. 16 is a voltage waveform 1600 diagram illustrating the load-connected switched output voltage 1602 ($V_O$) for the second operating mode for the voltage compensation device 18. That is, FIG. 16 illustrates the output voltage 1602 ($V_O$) after the load switch 40 ($S_L$) is closed, which brings the load capacitor 44, the notch filter 46, and the load 14 into the circuit in parallel with the autotransformer 20. The no-load switched output voltage 1402 ($V_O$) is shown as a phantom line for comparison purposes. As shown in FIG. 16, closing the load switch 40 ($S_L$) drives the output voltage 1602 ($V_O$) toward a one per-unit sinusoidal waveform, representing a compensation for the voltage sag or over-voltage condition occurring in the source voltage 802 ($V_S$). It should be appreciated that load capacitor 44 carries and smoothes substantially all of the load current in this mode of operation. Again, those skilled in the art will appreciate that area under the curve 1402 is the same as the area under the curve 1602, which allows the peak level of the output voltage 1602 ($V_O$) to be adjusted by controlling the pulse-width modulation scheme for gating the switch 52.

Figure 17:
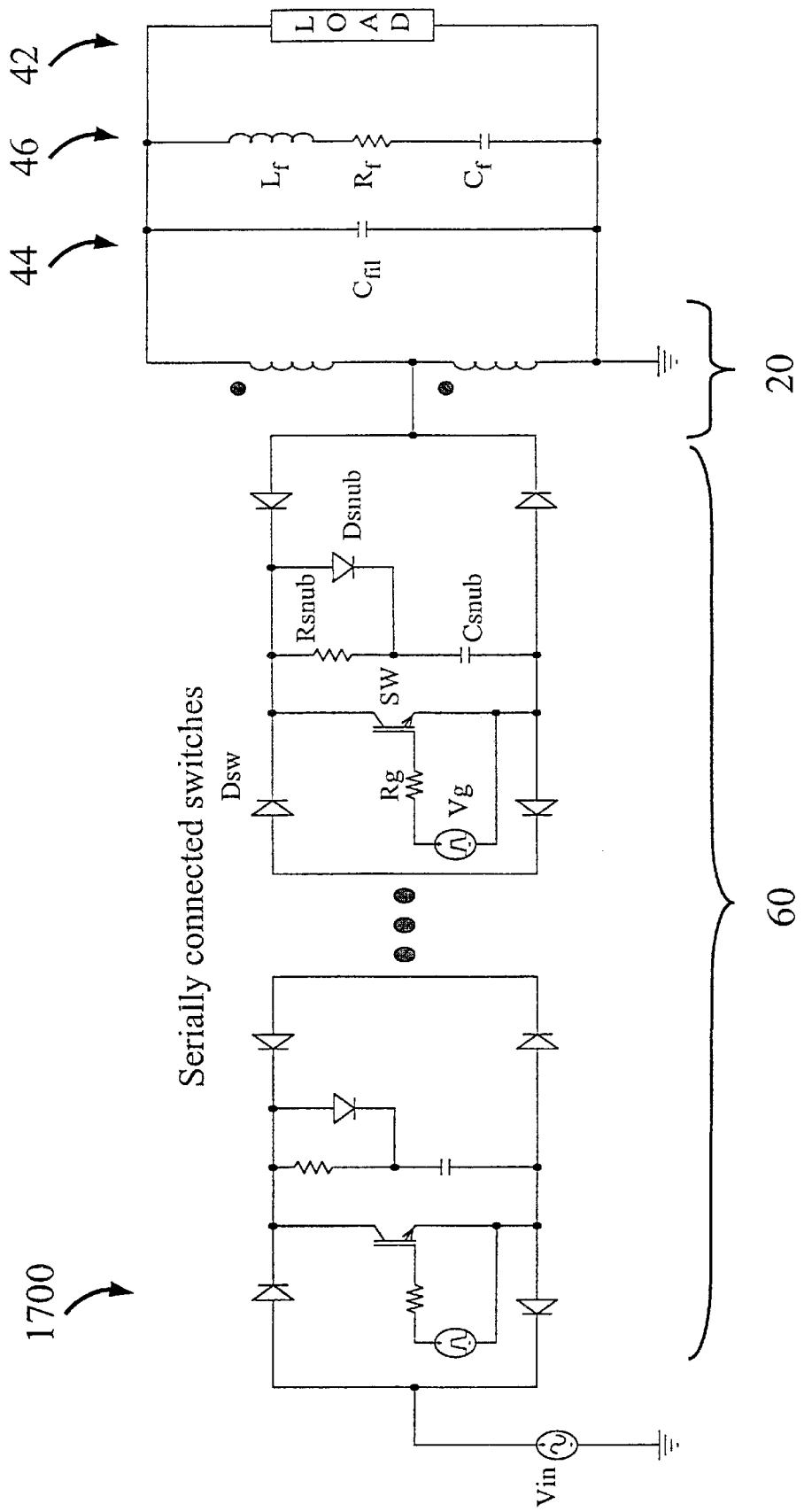
FIG. 17 is an equivalent electric circuit diagram for a voltage sag and over-voltage compensation device suitable for computer modeling of the circuit.

FIG. 17 is an equivalent electric circuit diagram 1700 for the voltage compensation device 18. The equivalent electric circuit for the cascade switch 30, with the series-connected full-bridge rectifiers, are shown on the left of FIG. 17. The equivalent electric circuit for the autotransformer 20 is shown on the center of FIG. 17. To the right of the autotransformer 20, from left to right in parallel connection, FIG. 17 shows the equivalent electric circuits for the load capacitor 44, the notch filter 46, and the load 14.

Figure 18:
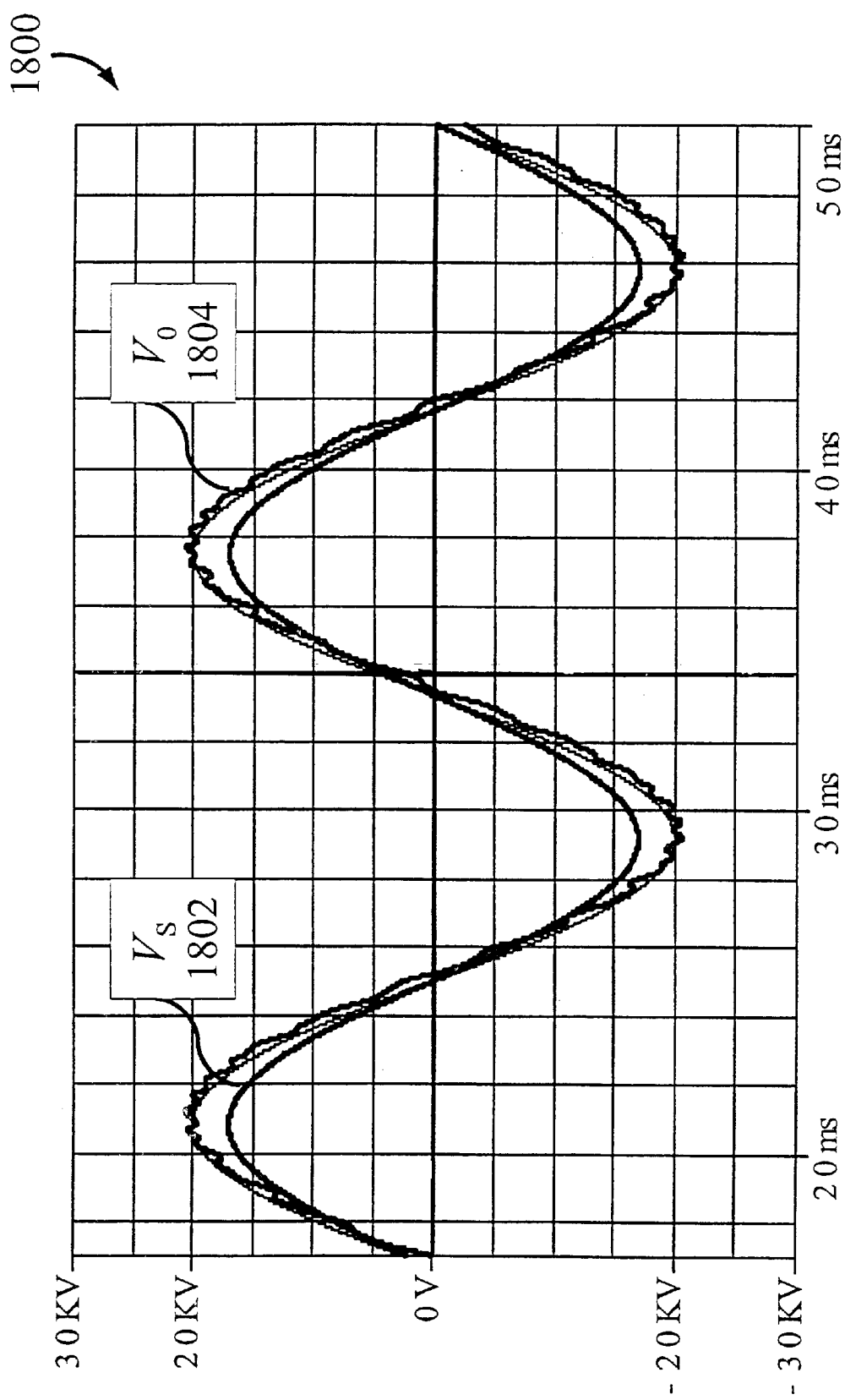
FIG. 18 is a voltage waveform diagram illustrating the results of a computer model of a voltage sag and over-voltage compensation device used for voltage amplification (e.g., voltage sag compensation).
Figure 19:
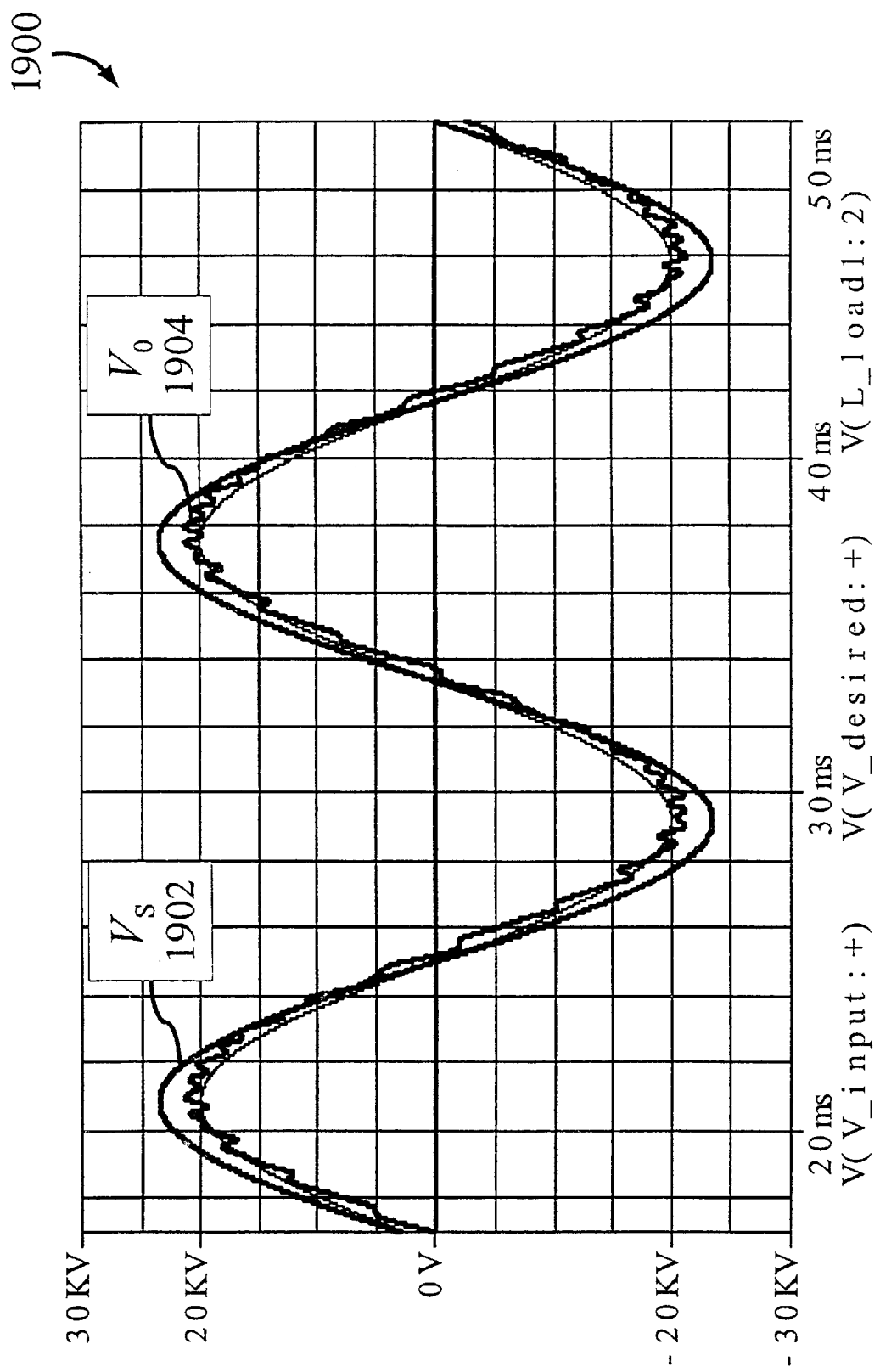
FIG. 19 is a voltage waveform diagram illustrating the results of a computer model of a voltage sag and over-voltage compensation device used for voltage reduction (e.g., over-voltage compensation).

FIG. 18 is a voltage waveform diagram 1800 illustrating the results of a computer model of the equivalent electric circuit diagram 1700 used for voltage amplification (i.e., voltage sag compensation). That is, the input voltage 1802 is smaller than the output voltage 1804. FIG. 19 is a voltage waveform diagram 1900 illustrating the results of a computer model of the equivalent electric circuit diagram 1700 used for voltage reduction (i.e., over-voltage compensation). That is, the input voltage 1802 is larger than the output voltage 1804. Those skilled in the art will appreciate that pulse-width modulation scheme for gating the switches 52 and 54 (in the first operation mode, control routine 600) or for gating the switch 52 (in the second operation mode, control routine 700) may be selected to produce an output voltage ($V_O$) that is greater than, or smaller than, the input source voltage 802 ($V_S$), within the operational range of the voltage compensation device 18. It should also be noted that the pulse width required to produce a desired output voltage from the voltage compensation device 18 is somewhat greater in the second operation mode, control routine 700, as compared to the first operation mode, control routine 600. But the switching devices are less expensive for the second operation mode because the upper-pole switching devices may be less expensive zero-current switching devices, such as thyrstors, rather than non-zero-current-switching devices, such as IGBTs. In addition, the upper-pole snubbers may be eliminated or replaced with lower cost voltage dividing circuitry when the upper pole switches can only switch under zero-current conditions.

It should be understood that the foregoing relates only to the exemplary embodiments of the present invention, and that numerous changes may be made therein without departing from the spirit and scope of the invention as defined by the following claims.

The invention claimed is:

1. A device for selectively receiving electric power from an AC power source oscillating at a system frequency, adjusting the voltage of the power, and delivering a corresponding voltage-corrected AC power supply to a load connected across an upper pole and a neutral pole of the device; comprising:

an autotransformer having:
  a first winding around a flux linking core and connected between the neutral pole and a center pole;
  a second winding around the flux linking core and connected between the center pole and the upper pole;

a center-pole switch for selectively connecting the AC power source between the neutral and center poles when the center-pole switch is gated to a closed configuration, and for selectively disconnecting the AC power source from connection between the neutral and center poles when the center-pole switch is gated to an open configuration; and a control unit for selectively gating the center-pole switch between the open configuration and the closed configuration multiple times per cycle of the system frequency to generate the voltage-corrected AC power supply for delivery to the load.

2. The device of claim 1, wherein the center-pole switch is located within a full-bridge rectifier circuit connected between the AC power source and the center pole.

3. The device of claim 1, further comprising a center-pole snubber connected in parallel with the center-pole switch.

4. The device of claim 1, further comprising:
a center-pole snubber connected in parallel with the center-pole switch; and
the center-pole switch and the center-pole snubber located within a full-bridge rectifier circuit connected between the AC power source and the center pole.

5. The device of claim 1, wherein the center-pole switch comprises a cascade of individual center-pole switching devices connected in series and operated substantially simultaneously.

6. The device of claim 5, wherein each individual center-pole switching device is located within an individual full-bridge rectifier circuit.

7. The device of claim 6, further comprising a plurality of center-pole snubber circuits, each connected in parallel with one of the individual switching devices and located within a corresponding full-bridge rectifier circuit.

8. The device of claim 7, wherein each center-pole snubber circuit comprises a resistor and a capacitor connected in series and a diode connected in parallel with the resistor.

9. The device of claim 1, further comprising a capacitor connected between the neutral and upper poles and configured to smooth the voltage-corrected AC power supply toward a sinusoidal power supply at the system frequency.

10. The device of claim 1, wherein the control unit gates the center-pole switch at a gating frequency, further comprising a notch filter connected between the neutral and upper poles and configured to reduce power disturbances occurring in the voltage-corrected AC power supply within a filter frequency range comprising the gating frequency.

11. The device of claim 10, wherein the notch filter comprises an inductor, a resistor and a capacitor connected in series.

12. The device of claim 1, further comprising an upper-pole switch for selectively connecting the AC power source between the neutral and upper poles when the upper-pole switch is gated to a closed configuration, and for selectively disconnecting the AC power source from connection between the neutral and upper poles when the upper-pole switch is gated to an open configuration.

13. The device of claim 12, further comprising an upper-pole snubber connected in parallel with the upper-pole switch.

14. The device of claim 12, wherein the upper-pole switch comprises a cascade of individual upper-pole switching devices connected in series and operated substantially simultaneously.

15. The device of claim 14, wherein each individual upper-pole switching device is located within an individual full-bridge rectifier circuit.

16. The device of claim 15, further comprising a plurality of upper-pole snubber circuits, each connected in parallel with one of the individual switching devices and located within a corresponding full-bridge rectifier circuit.

17. The device of claim 16, wherein each upper-pole snubber circuit comprises a resistor and a capacitor connected in series and a diode connected in parallel with the resistor.

18. The device of claim 12, wherein the control unit is configured for gating the upper-pole and center-pole switching devices in substantial unison to maintain said switches in opposing configurations.

19. The device of claim 12, wherein the control unit is configured for:
    detecting a voltage sag or over-voltage condition in the AC power source;
    in response to detecting the voltage sag or over-voltage condition, continually gating the upper-pole and center-pole switching devices in substantial unison to maintain said switches in opposing configurations to create a desired voltage-corrected AC power supply;
    detecting a cessation of the voltage sag or over-voltage condition in the AC power source;
    in response to detecting the cessation of the voltage sag or over-voltage condition, gating the center-pole switching device to an open configuration, gating the upper-pole switching device to a closed configuration, and discontinuing further gating of switching devices.

20. The device of claim 12, wherein the control unit is configured for:
    detecting a voltage sag or over-voltage condition in the AC power source;
    in response to detecting the voltage sag or over-voltage-condition, gating the upper-pole switching device to an open configuration;
    while the upper-pole switching device is in the open configuration, continually gating the center-pole switching device between the open and closed configurations to create a desired voltage-corrected AC power supply;
    detecting a cessation of the voltage sag or over-voltage condition in the AC power source; and
    in response to detecting the cessation of the voltage sag or over-voltage condition, gating the center-pole switching device to an open configuration, gating the upper-pole switching device to a closed configuration, and discontinuing further gating of switching devices.

21. A device for selectively receiving electric power from an AC power source oscillating at a system frequency, adjusting the voltage of the power, and delivering a corresponding voltage-corrected AC power supply to a load connected across an upper pole and a neutral pole of the device; comprising:
    an autotransformer having:
        a first winding around a flux linking core and connected between the neutral pole and a center pole;
        a second winding around the flux linking core and connected between the center pole and the upper pole;
    a cascade of series connected full-bridge rectifier circuits connected between the AC power source and the center pole;
    a plurality of center-pole switching devices, each located within a corresponding full-bridge rectifier circuit, for selectively connecting the AC power source between the neutral and center poles when the center-pole switching devices are gated to a closed configuration, and for selectively disconnecting the AC power source from connection between the neutral and center poles when the center-pole switching devices are gated to an open configuration; and
    a control unit for selectively gating the center-pole switching devices a between the open configuration and the closed configuration multiple times per cycle of the system frequency to generate the voltage-corrected AC power supply for delivery to the load.

22. The device of claim 21, further comprising:
    a plurality of center-pole snubber circuits, each connected in parallel with a corresponding center-pole switching device; and
    each center-pole switching device and each corresponding center-pole snubber circuit located within a corresponding full-bridge rectifier circuit connected between the AC power source and the center pole.

23. The device of claim 22, wherein each snubber circuit comprises a resistor and a capacitor connected in series and a diode connected in parallel with the resistor.

24. The device of claim 23, further comprising a capacitor connected between the neutral and upper poles and configured to smooth the voltage-corrected AC power supply toward a sinusoidal power supply at the system frequency.

25. The device of claim 24, wherein the control unit gates the center-pole switching device at a gating frequency, further comprising a notch filter connected between the neutral and upper poles and configured to reduce power disturbances occurring in the voltage-corrected AC power supply in a filter frequency range comprising the gating frequency.

26. The device of claim 25, wherein the notch filter comprises an inductor, a resistor and a capacitor connected in series.

27. The device of claim 25, further comprising a plurality of upper-pole switching devices, each located within a corresponding full-bridge rectifier circuit, for selectively connecting the AC power source between the neutral and upper poles when the upper-pole switching devices are gated to a closed configuration, and for selectively disconnecting the AC power source from connection between the neutral and upper poles when the upper-pole switching devices are gated to an open configuration.

28. The device of claim 27, further comprising:
    a plurality of upper-pole snubber circuits, each connected in parallel with a corresponding upper-pole switching device; and each upper-pole switching device and each corresponding upper-pole snubber circuit located within a corresponding full-bridge rectifier circuit connected between the AC power source and the upper pole.

29. The device of claim 28, wherein the control unit is configured for gating the upper-pole and center-pole switching devices in substantial unison to maintain said switches in opposing configurations.

30. The device of claim 28, wherein the control unit is configured for:

detecting a voltage sag or over-voltage condition in the AC power source;

in response to detecting the voltage sag or over-voltage condition, continually gating the upper-pole and center-pole switching devices in substantial unison to maintain said switches in opposing configurations to create a desired voltage-corrected AC power supply;

detecting a cessation of the voltage sag or over-voltage condition in the AC power source;

in response to detecting the cessation of the voltage sag or over-voltage condition, gating the center-pole switching device to an open configuration, gating the upper-pole switching device to a closed configuration, and discontinuing further gating of switching devices.

31. The device of claim 28, wherein the control unit is configured for:

detecting a voltage sag or over-voltage condition in the AC power source;

in response to detecting the voltage sag or over-voltage condition, gating the upper-pole switching device to an open configuration;

while the upper-pole- switching device is in the open configuration, continually gating the center-pole switching device between the open and closed configurations to create a desired voltage-corrected AC power supply;

detecting a cessation of the voltage sag or over-voltage condition in the AC power source; and in response to detecting the cessation of the voltage sag or over-voltage condition, gating the center-pole switching device to an open configuration, gating the upper-pole switching device to a closed configuration, and discontinuing further gating of switching devices.

32. A device for selectively receiving electric power from an AC power source oscillating at a system frequency, adjusting the voltage of the power, and delivering a corresponding voltage-corrected AC power supply to a load connected across an upper pole and a neutral pole of the device; comprising:

an autotransformer having:

a first winding around a flux linking core and connected between the neutral pole and a center pole;

a second winding around the flux linking core and connected between the center pole and the upper pole;

a cascade of series connected full-bridge rectifier circuits connected between the AC power source and the center pole;

a plurality of center-pole switching devices, each located within a corresponding full-bridge rectifier circuit, for selectively connecting the AC power source between the neutral and center poles when the center-pole switching devices are gated to a closed configuration, and for selectively disconnecting the AC power source from connection between the neutral and center poles when the center-pole switching devices are gated to an open configuration;

a plurality of center-pole snubber circuits, each connected in parallel with a corresponding center-pole switching device, and each center-pole switching device and each corresponding center-pole snubber circuit located within a corresponding full-bridge rectifier circuit connected between the AC power source and the center pole;

a plurality of upper-pole switching devices, each located within a corresponding full-bridge rectifier circuit, for selectively connecting the AC power source between the neutral and upper poles when the upper-pole switching devices are gated to a closed configuration, and for selectively disconnecting the AC power source from connection between the neutral and upper poles when the upper-pole switching devices are gated to an open configuration;

a plurality of upper-pole snubber circuits, each connected in parallel with a corresponding upper-pole switching device, and each upper-pole switching device and each corresponding upper-pole snubber circuit located within a corresponding full-bridge rectifier circuit connected between the AC power source and the upper pole;

a capacitor connected between the neutral and upper poles and configured to smooth the voltage-corrected AC power supply toward a sinusoidal power supply at the system frequency;

a control unit for selectively gating the center-pole switching devices a between the open configuration and the closed configuration at a gating frequency that is substantially higher than the system frequency to generate the voltage-corrected AC power supply for delivery to the load; and a notch filter connected between the neutral and upper poles and configured to reduce power disturbances occurring in the voltage-corrected AC power supply in a filter frequency range comprising the gating frequency.

* * * * *